United States Patent [19]
Miyashita et al.

[11] Patent Number: 6,011,602
[45] Date of Patent: Jan. 4, 2000

[54] LIGHTING APPARATUS WITH A LIGHT GUIDING BODY HAVING PROJECTIONS IN THE SHAPE OF A TRAPEZOID

[75] Inventors: Satoru Miyashita; Osamu Yokoyama; Tatsuaki Funamoto, all of Suwa, Japan

[73] Assignee: Seiko Epson Corporation, Tokyo, Japan

[21] Appl. No.: 08/860,631

[22] PCT Filed: Nov. 6, 1996

[86] PCT No.: PCT/JP96/03243

§ 371 Date: Jul. 3, 1997

§ 102(e) Date: Jul. 3, 1997

[87] PCT Pub. No.: WO97/17631

PCT Pub. Date: May 15, 1997

[30] Foreign Application Priority Data

| Nov. 6, 1995 | [JP] | Japan | 7-287718 |
| Nov. 9, 1995 | [JP] | Japan | 7-291489 |
| Dec. 25, 1995 | [JP] | Japan | 7-337389 |
| Jan. 26, 1996 | [JP] | Japan | 8-012109 |
| Feb. 5, 1996 | [JP] | Japan | 8-019032 |

[51] Int. Cl.$^7$ .............. G02F 1/1335; F21V 7/04
[52] U.S. Cl. ................. 349/65; 349/61; 349/62; 349/64; 362/31
[58] Field of Search ................ 349/61, 62, 64, 349/112, 65; 362/26, 31

[56] References Cited

U.S. PATENT DOCUMENTS

| 5,372,756 | 12/1994 | Oyama | 349/65 |
| 5,377,027 | 12/1994 | Jelley et al. | 349/61 |

(List continued on next page.)

FOREIGN PATENT DOCUMENTS

| 57-54926 | 4/1982 | Japan . |
| 58-95780 | 6/1983 | Japan . |
| 2-17 | 1/1990 | Japan . |
| 3-171117 | 7/1991 | Japan . |

(List continued on next page.)

OTHER PUBLICATIONS

Proceedings of the 15$^{th}$ International Display Research Conference, Asia Display '95, Oct. 16–18, 1995, "Reflective Cholesteric Polariser Improving the Light Yield of Back–and Side–Lighted Flat Panel Liquid Crystal Displays", D.J. Broer et al., pp. 735–738.

(List continued on next page.)

*Primary Examiner*—William L. Sikes
*Assistant Examiner*—Heidi L. Eisenhut
*Attorney, Agent, or Firm*—Oliff & Berridge, PLC

[57] ABSTRACT

A reflection layer is provided on a surface of a light guiding body on which projections are formed with intervals, except the side surfaces of the projections. A light emitting element is provided close to one end surface of a light guiding element. Most of the light from the light emitting element is input to the light guiding body through the light input surface. The light travels through the light guiding body to be output from the side surfaces of the projections. After passing through a directional change element, the light is input to the light receiving element in a direction substantially perpendicular to a light receiving element. Outside light passes through the light receiving element and is then input to a lighting apparatus. In the lighting apparatus, the outside light passes through the directional change element to be reflected by a reflection layer on the light-output-side surface of the light guiding body and then again passes perpendicularly through the directional change element toward the light receiving element. When the light passes through the light receiving element, a displayed image can be viewed. The reflection layer can reflect the light with a small loss. In addition, if the outside light is input at an angle of other than 90° to the light receiving element at first, the light can be reflected by the reflection layer with a small loss.

65 Claims, 29 Drawing Sheets

U.S. PATENT DOCUMENTS

| | | | |
|---|---|---|---|
| 5,396,350 | 3/1995 | Beeson et al. | 264/1.24 |
| 5,467,208 | 11/1995 | Kokawa et al. | 349/67 |
| 5,499,138 | 3/1996 | Iba | 349/61 |
| 5,612,487 | 3/1997 | Shirochi | 349/112 |
| 5,664,873 | 9/1997 | Kanda et al. | 349/62 |
| 5,712,694 | 1/1998 | Taira et al. | 349/62 |
| 5,859,675 | 1/1999 | Ogino | 349/62 |

FOREIGN PATENT DOCUMENTS

| | | |
|---|---|---|
| 4-303822 | 10/1992 | Japan . |
| 5-89827 | 4/1993 | Japan . |
| 6-27325 | 2/1994 | Japan . |
| 6-67004 | 3/1994 | Japan . |
| 6-130387 | 5/1994 | Japan . |
| 6-289391 | 10/1994 | Japan . |
| 6-324331 | 11/1994 | Japan . |
| 7-230002 | 8/1995 | Japan . |

OTHER PUBLICATIONS

Society For Information Display 95 Digest, International Symposium Digest of Technical Papers, vol. XXVI, 24.2, "Brighter Backlights Using Highly Scattered Optical–Transmission Polymer", A. Horibe et al., pp. 379–381.

Asia Display '95, Proceedings of the 15$^{th}$ International Display Research Conference, October 16–18, 1995, Reflective Cholestric Polariser Improving the Light Yield of Back–and Side–Lighted Flat Panel Liquid Crystal Displays, D.J. Broer et al., pp. 735–738.

PRIOR ART

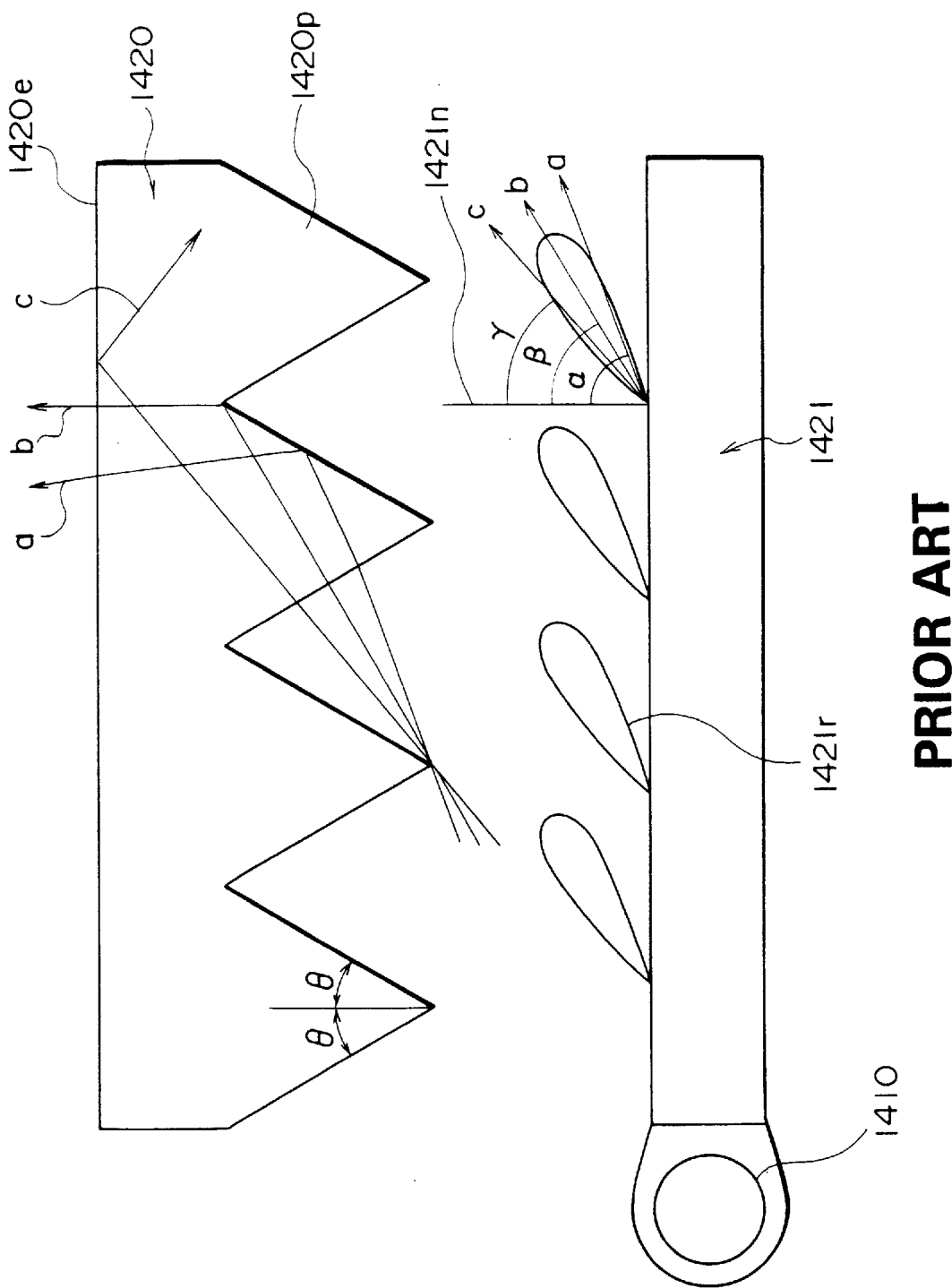

FIG.39A  PRIOR ART
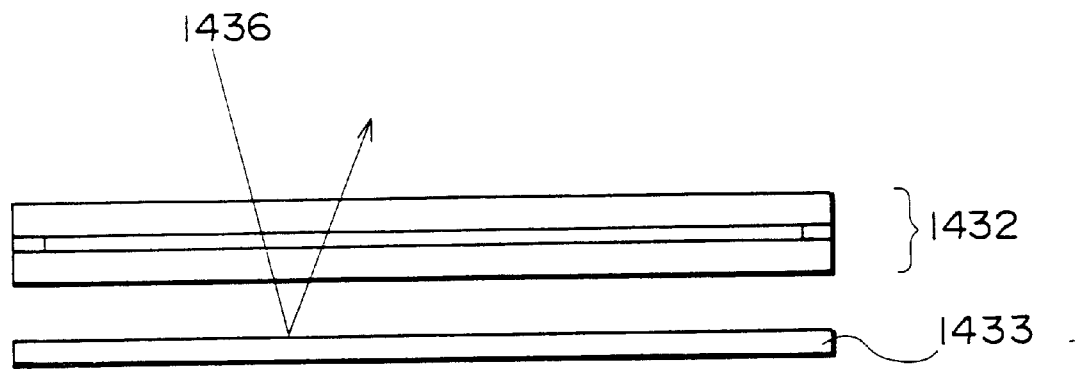
FIG.39B  PRIOR ART
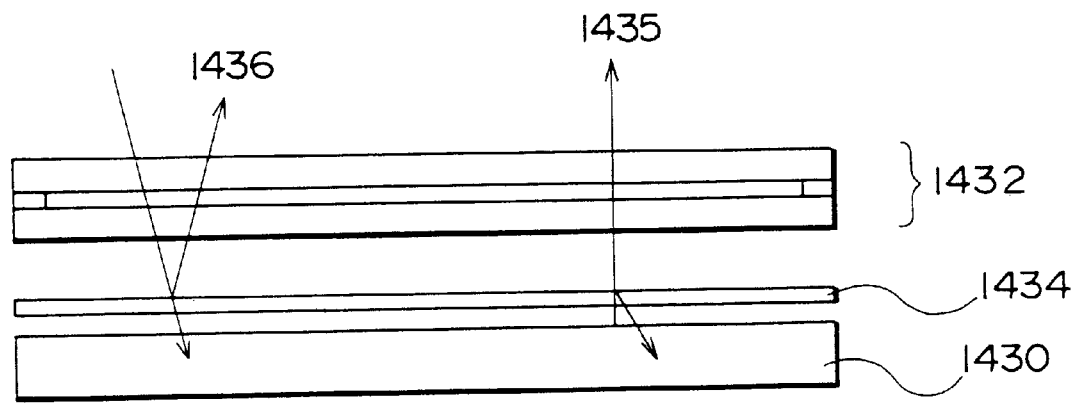

LIGHTING APPARATUS WITH A LIGHT GUIDING BODY HAVING PROJECTIONS IN THE SHAPE OF A TRAPEZOID

TECHNICAL FIELD

The present invention relates to a lighting apparatus, a liquid crystal display system using the lighting apparatus, and electronic equipment using the lighting apparatus. Particularly, it relates to a lighting apparatus which can utilize light with improved efficiency.

BACKGROUND ART (1) An example of a conventional liquid crystal display system is shown in FIG. 37. Such liquid crystal display system is generally provided with a dot-like printed layer, a white reflecting sheet or the like for irregular reflection at the back side of a light guide 1400, which guides the light from a light source 1401 to a liquid crystal display panel 1402, to obtain an uniform light intensity. In this case, since the light source emits light nondirectionally, the light can be uniformly diffused.

However, since the light is diffused, light directivity is lowered to lead to a low light intensity.

When the light intensity is increased, the light will be used inefficiently because the light is widely diffused, causing large power consumption. The lighting apparatus having such problems is not fit for long-time usage and not appropriate to portable electronic equipment.

When it is tried to lower the power consumption, however, the light intensity is also lowered.

(2) In order to solve these problems, it has been tried to increase directivity of the light from the light guide. Some known examples can be found in Japanese Patent Application Laid-open Nos. 5-089827, 6-067004, 6-130387,or the like. A prism array having fine prisms is used in these references to increase the light directivity. Each of the prisms has an apex which points the liquid crystal panel, and an apex angle is substantially 90°. By supposing the light source to be the point light source, considering the optical path, and controlling the apex angle, the light directivity can be increased.

When a prism array is used, the light directivity can be increased. However, since part of the light is reflected at the prism array due to the total internal reflection and is returned to the light guide to lower the light intensity.

Moreover, when the liquid crystal display panel is viewed at an oblique angle, the display looks dark. In other words, a wide viewing angle range cannot be obtained. Such display system cannot be applied to a color television, for example, because a display of television requires a uniform and high light intensity and a wide viewing angle range.

(3) Another example of the liquid crystal display system which uses a prism array for increasing the light directivity is disclosed in Japanese Patent Application Laid-Open No. 2-17. Part of this system is shown in FIG. 38.

In this reference, the prism array efficiently changes the direction of most of the input light to a direction substantially perpendicular to the liquid crystal display panel, when the apex angle of each prism is 60° and the normal to the liquid crystal display panel is in a position to halve the apex angle. In other words, each of prisms 1420*p* of a prism array 1420 has a vertical section which is an isosceles triangle, and its apex angle is 60° (the angle θ=30°), as shown in the figure. When light 1421*r* is output from the light guide at the angle β=60°, an available maximum light intensity can be obtained. When the light 1421*r* is output at the angle α=70°, which is 10° more than the angle β, or at the angle γ=50°, which is 10° less than the angle β, the light intensity is nearly half an available maximum value.

However, the light beam c which has been output at the angle γ is then reflected at an output surface 1420*e* of the prism array 1420 toward the light guide 1421 by the total internal reflection. Consequently, the transmittance of the light with respect to the prism array is low, and the light cannot be utilized efficiently.

Moreover, there is another example of the prism array in the above reference. In order to output the light from the prism array at an angle of 15° with respect to the normal to the liquid crystal display panel, the apex angle of each prism is set to 57°. Each prism comprises two surfaces which form the apex, and one surface is inclined at an angle of 35°, and another surface is inclined at an angle of 22° with respect to the normal to the liquid crystal display panel.

Even if the apex angle is controlled as described, however, there is the light which is reflected like the light beam c having the output angle γ, so that the light transmittance is not improved. In above-mentioned Japanese Patent Application Laid-Open No. 6-067004, the apex angle of the prism is controlled in the range of 70° to 110°. Also in this case, the above-mentioned problems still remain.

In the above-mentioned Japanese Patent Application Laid-Open No. 2-17, the shape of lenses provided on the light guide is modified. However, since the light is output at an angle of between about 60° and about 80° with respect to the light-output-side surface of the light guide, the problems as described are not solved independent of the lens shape, and the light directivity is low.

The lenses of the above reference turn the light to a particular direction to obtain improved directivity and intensity. In this case, the light has to be output from the light guide at an angle of 60° with respect to the normal to the liquid crystal display panel. Therefore, the above-mentioned problems still remain.

Note that the light-output-side surface of the light guide is not flat because a plurality of lenses are arranged on the light guide. The uneven surface of the light guide lowers the utilization efficiency of the light.

(4) Other examples of the liquid crystal display system are disclosed in Japanese Patent Application Laid-Open Nos. 57-054926 and 58-095780, for example. Respective liquid crystal display system are shown in FIGS. 39A and 39B.

In the example of FIG. 39A, a reflecting plate 1433 is placed at the back of a liquid crystal display panel 1432 to utilize light 1436 from outside. Because this system utilizes only reflected light, a sufficient contrast cannot be obtained, so that it cannot be used in a dark place.

In the example of FIG. 39B, a transflector (semitransparent plate) 1434 and a lighting apparatus 1430 are provided at the back of the liquid crystal display panel 1432. When the display system is in a bright place, the light from outside is used, and when the display system is in a dark place, the light from the lighting apparatus is used. Neither the outside light 1436 nor backlight 1435 can give a sufficient brightness to the display since a transflector is used.

(5) There is also a lighting apparatus disclosed in PROCEEDINGS OF THE 15TH INTERNATIONAL DISPLAY RESEARCH CONFERENCE, pp. 735–738, as an example of the apparatus for improving utilization efficiency of the light from the light source.

The schematic sectional view of the apparatus is shown in FIG. 40. The light from a light source 1440 passes through a light guide 1441 to be diffused by a diffusing plate 1442. The diffused light is input to a polarizer 1443 which comprises a cholesteric liquid crystal layer 1444 and a quarter wave film 1445. Circularly-polarized light is reflected by the cholesteric liquid crystal layer when the direction of rotation of the circularly-polarized light is the same as that of helical structure of the cholesteric liquid crystal layer. When the direction of rotation of the circularly-polarized light is reverse to that of helical structure of the cholesteric liquid crystal layer, the circularly-polarized light can pass through it. Circularly-polarized light d which has passed the cholesteric liquid crystal layer is converted into linearly-polarized light by the quarter wave film 1445. Circularly-polarized light e which has been reflected at the cholesteric liquid crystal layer is returned to the diffusing plate 1442 to be diffused. Part of the diffused light rotates in the reverse direction of the helical structure of the cholesteric liquid crystal layer 1444, so that the light is again input to and now passes through it as light f.

However, part of the light e which has been reflected by the cholesteric liquid crystal layer 1444 is returned to the light guide 1441 through the diffusing plate 1442 to be absorbed by a diffuse reflecting film 1449 provided at the back of the light guide 1441 as light g. In this way, part of the light is wastefully lost to lower the light intensity and utilization efficiency.

Accordingly, it is an object of the invention to provide a lighting apparatus which can utilize the light efficiently to improve the light intensity with a wide viewing angle range, a liquid crystal display using such a lighting apparatus, and electronic equipment also using such a lighting apparatus.

Another object of the invention is to provide a lighting apparatus which can operate sufficiently with a small power consumption, a liquid crystal display using such a lighting apparatus, and electronic equipment also using such a lighting apparatus.

Still another object of the invention is to provide a lighting apparatus which can change the direction of the light from the light guide efficiently to a direction substantially parallel to the normal to the light-output-side surface of the light guide to improve the utilization efficiency, a liquid crystal display using such a lighting apparatus, and electronic equipment also using such a lighting apparatus.

Further object of the invention is to provide a lighting apparatus which can operate without lowering utilization efficiency of the light and reflecting function independent of the outside brightness, a liquid crystal display using such a lighting apparatus, and electronic equipment also using such a lighting apparatus.

Still further object of the invention is to provide a lighting apparatus which improves the utilization efficiency of the light by converting the light which has been reflected by the polarizer so that the light can pass through the polarizer and be transmitted to the liquid crystal display panel, a liquid crystal display using such a lighting apparatus, and electronic equipment also using such a lighting apparatus.

DISCLOSURE OF THE INVENTION

According to a first aspect of the invention, there is provided a lighting apparatus comprising:
light emitting means; and
light guiding means for guiding the light from the light emitting means to a back surface of a light receiving element;

wherein the light guiding means comprises:
a light guiding body having at least one light input surface which receives the light from the light emitting means, and a light-output-side surface facing the light receiving element; and
a plurality of projections extending from the light-output-side surface of the light guiding body; and
wherein each of the projections has a top surface which is substantially parallel to the light-output-side surface, and side surfaces which are substantially perpendicular to the light-output-side surface.

In the conventional art, the light-output-side surface of the light guiding body may have no projection, or may have a plurality of lenses as shown in Japanese Patent Application Laid-Open No. 2-17. Since the light from the light-output-side-surface is diffused, improved directivity cannot be obtained.

In the present invention, high directivity can be given to the light by outputting most of the light from the projections formed on the light-output-side surface, especially from the side surfaces of the projections. The light is hardly output from the top surface of each projection and the light-output-side surface. Therefore, utilization efficiency and intensity of the light can be greatly improved, while decreasing the power consumption. This lighting apparatus can be effectively applied to various types of electronic equipment, especially to a portable digital assistant.

The projections may have a different refractive index from the light guiding body. By changing the material of the projections to vary the refractive index, an angle of refraction of the light can be controlled to give the available maximum intensity to any desired angle of light emitted from the light guiding body.

The ratio of width of the top surface to height of the side surfaces of each of the projections may be substantially 1:1. When the projections have such a size, there is less light that is reflected at the top surface of the projections and returned to the light guiding body. Consequently, directivity and intensity of the output light can be further improved.

A vertical section of each of the projections may be substantially a trapezoid, and the side surfaces of the projections may be inclined at an angle of 10° or less from a plane which is perpendicular to the light-output-side surface.

As long as the above-mentioned angle of the side surfaces is equal to or less than 10°, intensity of the output light can be prevented from lowering. This expands the range of tolerance for manufacturing.

The top surface of each of the projections may have a width ranging from 10 $\mu$m to 50 $\mu$m. When the top surface has such a size, the range of tolerance for manufacturing is expanded while improving intensity of the output light.

There may be provided a reflection layer on the light-output-side surface of the light guiding body for reflecting the light from outside and the light transmitted through the light guiding body.

When the light emitting means is provided close to each end of the light guiding body, most of the light which is input into the light guiding body will be output from both side surfaces of the projections. When the light emitting means is provided close to one of the ends of the light guiding body, most light will be output from one of the side surfaces which does not face the light emitting means. Because of the total internal reflection, most of the light which reaches the light-output-side surface or the top surfaces of the projections is reflected and is not output wastefully, even if the reflection layer is not provided. By providing a reflection layer at least on the light-output-side surface, utilization efficiency of the light which is transmitted through the light guiding body can be further improved.

Part of the light from outside also can be reflected by this reflection layer to be used efficiently.

The reflection layer may be further provided on the top surface of each of the projections.

In this case, if the light from inside strike the top surface, the light cannot pass through it. Most of the input light will be output from the side surfaces of the projections. This further improves utilization efficiency of the light and the light intensity. Since part of the light from outside also can be reflected by the reflection layer on the top surface to be utilized, the light intensity will be further improved. Unlike a light guiding means having a transflector (semitransparent plate), this light guiding means can utilize most of the light from outside.

The reflection layer may be further provided on one of the side surfaces of each of the projections when the one of the side surfaces looks toward the light emitting means.

When the light emitting means is provided adjacent to one of the ends of the light guiding body, almost no light is output from a side surface which faces the light emitting means. Providing the reflection layer on the side surface which faces the light emitting means further improves utilization efficiency of the light and light intensity.

The light guiding body may be provided with the reflection layer on all side surfaces except the light input surface.

This reflection layer can prevent the light from being output wastefully through the side surfaces of the light guiding body except the light input surface and can improve utilization efficiency of the light.

The reflection layer may be made of a thin metal film. Therefore, the reflection layer can be easily formed by depositing.

The reflection layer provided on the light guiding body may be made of a mirror sheet when a reflecting surface of the mirror sheet faces the light guiding body.

The projections may be in the form of a grating on the light-output-side surface. Since a grating structure increases an area for outputting the light, the light intensity can be improved.

The number of the projections per unit area may become small nearer to the light emitting means, and large farther from the light emitting means. By controlling the number of the projections, the light having an uniform intensity can be output.

A vertical-sectional area of each of the projections may become large farther from the light emitting means. By controlling the vertical-sectional area, the light having an uniform intensity can be output.

The lighting apparatus may further comprise directional change means for changing the direction of the light which is output from the light guiding means to a direction substantially perpendicular to the light receiving element.

This directional change means enables the light from the projections to be transmitted toward the light receiving element at a desired angle. If a lighting apparatus having such directional change means is applied to a liquid crystal display system, for example, a wide viewing angle range and a high luminous brightness can be realized.

The light emitting means may be in the form of a cylinder extending along the light input surface of the light guiding body, and the directional change means may include a prism array which comprises a plurality of prisms arranged in parallel to each other and to the light emitting means, each of the prisms having an apex pointing to the light-output-side surface.

The apex of each prism faces the light-output-side surface, and a top surface of the prism array facing the light receiving element is formed to be flat. Therefore, the light can be uniformly output to the light receiving element to improve the light intensity.

A vertical section of each prism may be substantially a triangular, and an angle of the apex may range from 50° to 70°. Since the prism with such an apex can change the direction of the light from the projections more precisely into a vertical direction, light with improved directivity and intensity can be output.

Each of the prisms may have a first surface for receiving the light and a second surface when the apex is formed by these first and second surfaces. This first surface may comprise a plurality of planes, when the normals to the planes are different from each other.

The first surface includes various planes such that most of the light bemas input through the first surface with different incident angles can be reflected at the second surface due to the total internal reflection to be output in a direction almost perpendicular to the flat top surface of the prism array. In this way, the input light can be transmitted through the prism array with a small loss and a high intensity.

If the light guiding means does not have the projections of this invention, part of the light which is input through the first surface cannot reach the second surface. Such light is reflected by the top surface and returned to the light guiding means. In the present invention, however, the input light can be transmitted more efficiently, further improving the light directivity and intensity.

The first surface may comprise a plane tilted at an angle of about 20° from the plane which is perpendicular to the light-output-side surface, and the second surface may be tilted at an angle of about 30° from the plane which is perpendicular to the light-output-side surface.

By tilting the first and second surfaces as described, the light directivity and intensity can be further improved.

The directional change means may have a structure of diffraction grating which is provided parallel to the light-output-side surface.

Diffraction efficiency of the diffraction grating structure depends on the incident angle of the input light. Since the projections of the present invention outputs the light with improved directivity, the diffraction grating structure can efficiently change the direction of the input light, and less light is returned to the light guiding means by the diffraction grating structure than by the prism array. Consequently, the light can be transmitted through the diffraction grating structure with a small loss and the light intensity can be improved.

The directional change means may include a hologram element which has a photosensitive layer made of a photosensitive material, when the structure of diffraction grating is recorded on the photosensitive layer.

Since the light guiding means of the invention outputs the light with improved directivity, the hologram element can efficiently change the direction of the light, and less light is returned to the light guiding means by the hologram element than by the prism array. Therefore, the light can be transmitted through the hologram element with a small loss and the light intensity can be improved.

The diffraction grating of the directional change means may be a blazed grating which has a sawtooth vertical section to improve directivity and intensity of the light.

The lighting apparatus may further comprises polarizing means which is provided between the light receiving element and the directional change means to convert the light which is output from the directional change means into linearly-polarized light.

Part of the input light can pass through the polarizing means. The light which cannot pass through the polarizing means is returned to the light guiding means and reflected again by the reflection layer on the light guiding means toward the polarizing means with a small loss. Therefore, the light from the light emitting means can be efficiently converted into linearly-polarized light, and an improved light intensity can be obtained.

The polarizing means may comprise:
a cholesteric liquid crystal layer provided to face the prism array; and
a quarter wave film which generates retardation by a quarter wavelength and is provided on the cholesteric liquid crystal layer.

The light is transmitted through the cholesteric liquid crystal layer and then converted into linearly-polarized light by the quarter wave film to be output in a direction perpendicular to the light receiving element.

Generally, the direction of rotation of circularly-polarized light which can pass through a cholesteric liquid crystal layer is limited. When only dextrorotatory (right-handed) circularly-polarized light can pass through a cholesteric liquid crystal layer, for example, the levorotatory (left-handed) circularly-polarized light will be reflected. Thus intensity of the light will be lowered.

In the present invention, reflected levorotatory circularly-polarized light is then transmitted to the reflection layer on the light guiding means, and the levorotatory circularly-polarized light is converted into dextrorotatory circularly-polarized light on reflection at the reflection layer. The converted light is again input to the polarizing means and now can pass through it. Therefore, this polarizing means can provide a more improved light intensity.

According to a second aspect of the invention, there is provided a lighting apparatus comprising:
light emitting means;
light guiding means which has a light-output-side surface and guides the light from the light emitting means through the light-output-side surface toward a light receiving element with improved directivity; and
directional change means for changing the direction of the light which is output from the light guiding means to a direction substantially perpendicular to the light receiving element;
wherein the directional change means has a structure of a diffraction grating which is parallel to the light-output-side surface.

Since the light is input with improved directivity, the diffraction grating structure can efficiently change the direction of the input light, and less light is returned to the light guiding means by the diffraction grating structure than by the prism array. Therefore, the light intensity can be improved.

According to a third aspect of the invention, there is provided a lighting apparatus comprising:
light emitting means;
light guiding means which has a light-output-side surface and guides the light from the light emitting means through the light-output-side surface toward a light receiving element with improved directivity; and
directional change means for changing the direction of the light which is output from the light guiding means to a direction substantially perpendicular to the light receiving element;
wherein the directional change means includes a prism array which comprises a plurality of prisms, each of the prisms having an apex pointing to the light-output-side surface;
wherein each of the prisms has a first surface for receiving the light and a second surface, the apex being formed by these first and second surfaces; and
wherein the first surface comprises a plurality of planes, the normals to the planes being different from each other.

The first surface has a plurality of planes such that most of the light beams input through the first surface with different incident angles can be reflected at the second surface due to the total internal reflection to be output in a direction almost perpendicular to the flat top surface of the prism array. Therefore, the input light can be transmitted through the prism array with a small loss and a high intensity.

According to a fourth aspect of the invention, there is provided a lighting apparatus comprising:
light emitting means for lighting a light receiving element; and
light guiding means for guiding the light from the light emitting means to the light receiving element;
wherein the light guiding means has a first surface from which the light is output to the light receiving element, and a second surface from which no light is output; and
wherein a reflection layer which reflects the light from outside and the light guided through the light guiding means is provided on the second surface.

The lighting apparatus having such a reflection layer realizes efficient backlighting with low power consumption, so that it can be effectively applied to electronic equipment such as a portable digital assistant.

According to a fifth aspect of the invention, there is provided a liquid crystal display system comprising the above-described lighting apparatus, wherein the light receiving element is a liquid crystal display panel. The liquid crystal display system provides a bright display by the light with an uniform and high intensity.

The liquid crystal display system may further comprise light diffusing means which is provided between the liquid crystal display panel and the light guiding means.

The light diffusing means can diffuse the light which passes through the liquid crystal display panel, providing a bright display with improved uniformity.

A mirror sheet for reflecting the light input to the light guiding means may be provided at the opposite side to the light-output-side surface of the light guiding means.

This mirror sheet can reduce the light which is wastefully output from the light guiding means and can increase utilization efficiency.

The light diffusing means may be provided at the front of the liquid crystal display panel.

Such light diffusing means can diffuse the light which has passed through the liquid crystal display panel, providing a wide viewing angle range.

The liquid crystal display system of the present invention as described may be applied to electronic equipment of low power consumption, downsized electronic equipment, or the like.

BRIEF DESCRIPTION OF DRAWINGS

FIG. 38 is a sectional view of a conventional prism array used in a lighting apparatus.

FIGS. 39A and 39B are sectional views showing additional examples of a conventional liquid crystal display system.

BEST MODE FOR CARRYING OUT THE INVENTION

Preferred embodiments of the present invention will be specifically described below with reference to the drawings.

Embodiment 1

Embodiment 1 of the present invention will now be described with reference to FIGS. 1 to 4. A sectional view of the liquid crystal display system is shown in FIG. 1, and a perspective view of the light guide is shown in FIG. 2.

Figure 1:
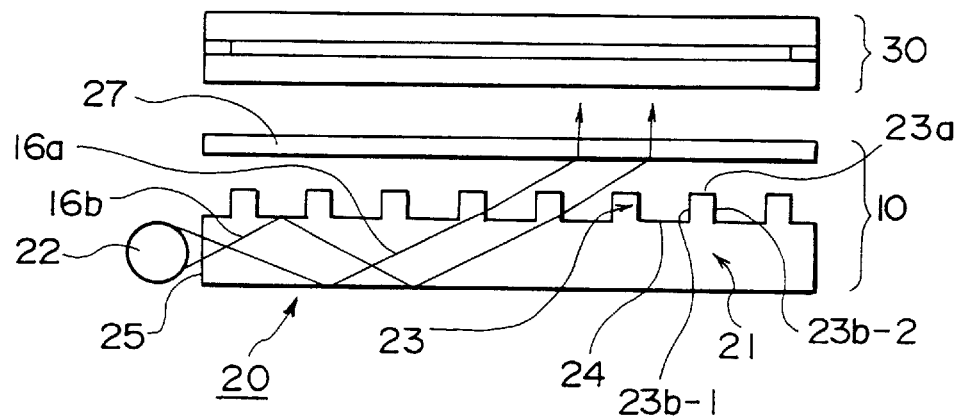
FIG. 1 is a sectional view of the liquid crystal display system as an embodiment of the present invention.

The liquid crystal display system of this embodiment comprises a liquid crystal display panel 30 as a light receiving element, and a lighting apparatus 10 provided at the back of the liquid crystal display panel 30, as shown in FIG. 1.

The lighting apparatus 10 comprises a light guide 20 which guides the input light uniformly to be output, a cylindrical light source 22 or light emitting means provided close to a light input surface 25 which is one of end surfaces of the light guide 20, and a prism array 27 or directional change means provided to face a light-output-side surface 24 of the light guide 20. Around the light source 22, there is provided a reflecting mirror having a vertical section of a semicircle for reflecting the light from the light source 22 toward the light input surface 25 of the light guide 20. The light source 22 may be formed of a fluorescent tube, for example.

Figure 2:
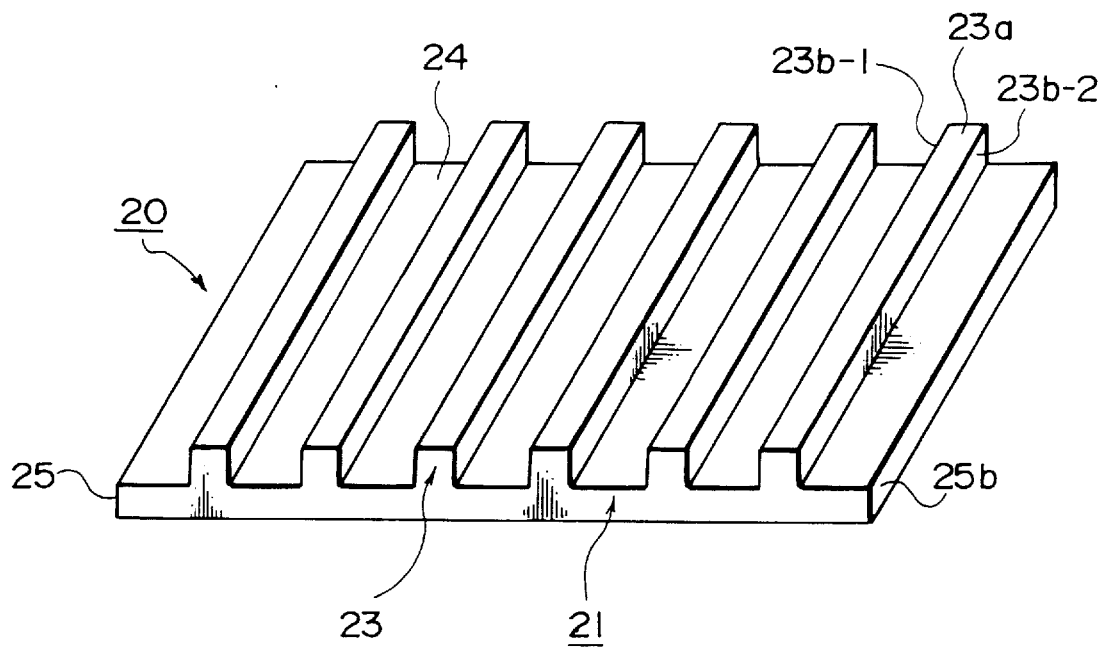
FIG. 2 is a perspective view of the light guide of FIG. 1.

The light guide 20 includes a light guiding body 21 which is in the form of a plate and made of a transparent material which has a refractive index of 1.4 or more, for example, and projections 23 extending from the light-output-surface 24 of the light guiding body 21, as shown in FIG. 2.

The light guiding body 21 and projections 23 are formed of a transparent material (for example, transparent resin such as acrylic resin or polycarbonate resin, inorganic transparent material such as glass, or compound of these materials). There are some preferable methods for manufacturing these elements, such as injection molding, etching, casting, bonding a film on a transparent resin or glass plate, and transfer-molding the projections on a transparent resin plate with a light curing resin.

The projections 23 are arranged on a surface of the light guiding body 21, being parallel to each other and to the cylindrical light source 22. Each of the projections 23 has a top surface 23a which is substantially parallel to the light-output-side surface 24, and side surfaces 23b-1 and 23b-2 which are substantially perpendicular to the light-output-side surface 24.

Figure 4:
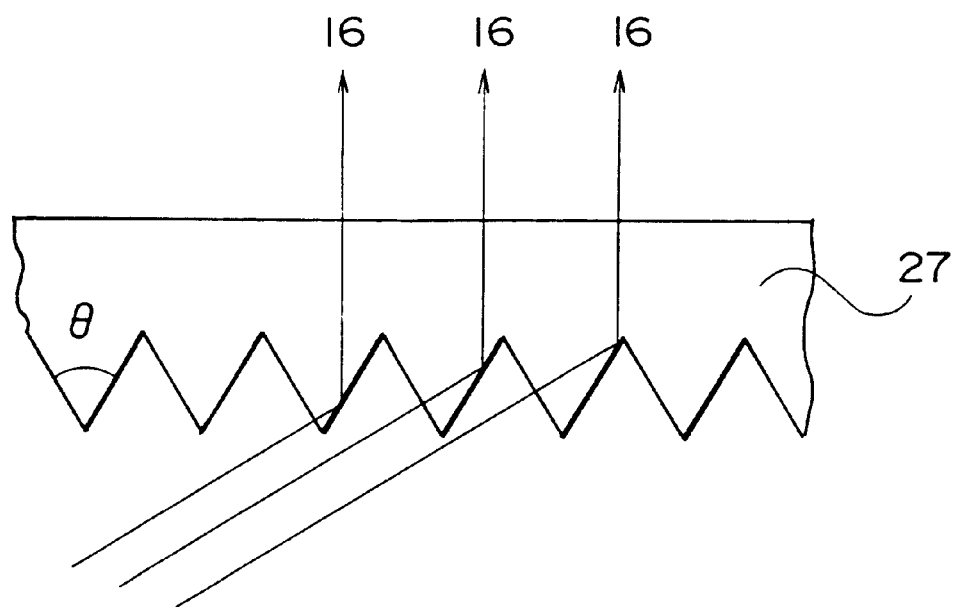
FIG. 4 is a sectional view schematically showing the light output from the lighting apparatus of FIG. 1.

The prism array 27 comprises a plurality of prisms, as shown in FIG. 4. Each prism has an apex which points toward the light guide. The vertical section of each prism is substantially an isosceles triangle, and each prism has an apex angle θ which is 60°, for example.

The liquid crystal display panel 30 may be formed of, for example, a twisted nematic (TN) liquid crystal which is used in an active matrix addressing with a thin-film transistor used as a pixel switch, a super twisted nematic (STN) liquid crystal which is used in a passive matrix addressing, or polymer dispersed liquid crystal. Note that the liquid crystal display panel 30 is not limited to a monochrome display, but may be formed as a multi-color display panel with a color filter.

The function of the liquid crystal display system of this embodiment having above-described elements will be described below.

The light beams 16a and 16b from the light source 22 are input to the light guiding body 21 through the light input surface 25 before repeating total internal reflection, and then are output from the side surfaces 23b-1, 23b-2 of the projections 23. Thus the light is efficiently and uniformly emitted toward the prism array 27.

A thin air gap is provided between the light-output-side surface 24 of the light guiding body 21 and the prism array 27. Due to this air gap, the light can repeat total internal reflection in the light guiding body 21.

Figure 3:
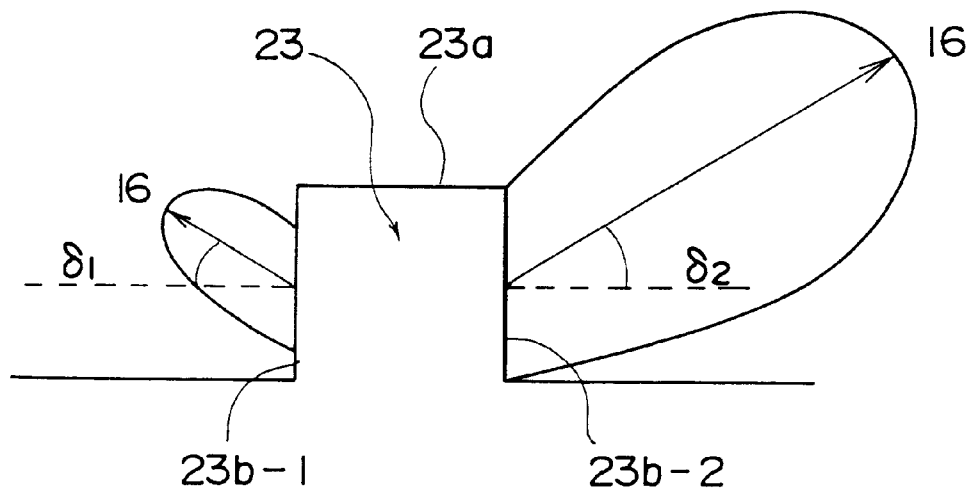
FIG. 3 is a sectional view schematically showing the light output from the light guide of FIG. 2.

The research for the light guiding body by the inventors has clarified that most of the light output from the projections 23 exits from the side surface 23b-2, which does not face the light source 22, at an angle $\delta_2=30°$ with respect to a horizontal plane, as shown in FIG. 3. Part of the light output from the projections 23 exits from the side surfaces 23b-1, which faces the light source 22, at an angle $\delta_1=30°$. In this case, the light has been reflected at an end surface 25b (see FIG. 2) which is far from the light source 22 before being output from the side surfaces 23b-1.

After passing through the prism array 27, the light is output in a direction substantially perpendicular to the liquid crystal display panel 30. In order to output the light from the lighting apparatus 10 in a direction substantially perpendicular to the liquid crystal panel 30, it is preferable that the apex angle θ of each prism of the prism array 27 is about 60°, as shown in FIG. 4.

Since the flat upper surface of the prism array 27 faces the liquid crystal display panel 30, the lighting apparatus 10 can output uniformly-distributed light. If each prism of the prism array has an apex angle θ of 90° and the apex points to the liquid crystal display panel 30, the light intensity may be greatly lowered depending on the direction of the light output from such prism array. With the lighting apparatus of this embodiment, however, the light intensity is not lowered, so that a wide viewing angle range can be obtained.

When the liquid crystal display panel 30 is applied to the liquid crystal display system of this embodiment, both TN liquid crystal and STN liquid crystal can be used to improve the brightness of the display panel. As a result, the power consumption will be lowered.

Embodiment 1 of the invention as described can provide following advantages.

(1) By improving utilization efficiency and intensity of the light, a bright display can be obtained.

(2) In the conventional art, the light-output-side surface of the light guiding body may have no projection, or may have a plurality of inclined lenses, as shown in Japanese Patent Application Laid-Open No. 2-17. Since the light beams are output from these light-output-side-surface in different directions, improved directivity cannot be obtained.

In this embodiment, however, a plurality of projections are provided on the light-output-side surface. Each of the projections has a top surface which is substantially parallel to the light-output-side surface and side surfaces which are substantially perpendicular to the light-output-side surface. Due to these projections, utilization efficiency of the light and the light intensity can be greatly improved. Moreover, the prism array of this embodiment enables the liquid crystal display panel to have a wide viewing angle range.

(3) The box-shaped projections can be more easily manufactured than conventional lenses formed on the light-output-side surface.

(4) The prism array of this embodiment does not necessarily require fine processing. By changing only the shape of the light guide, the light utilization efficiency can be improved.

Embodiment 2

Figure 5:
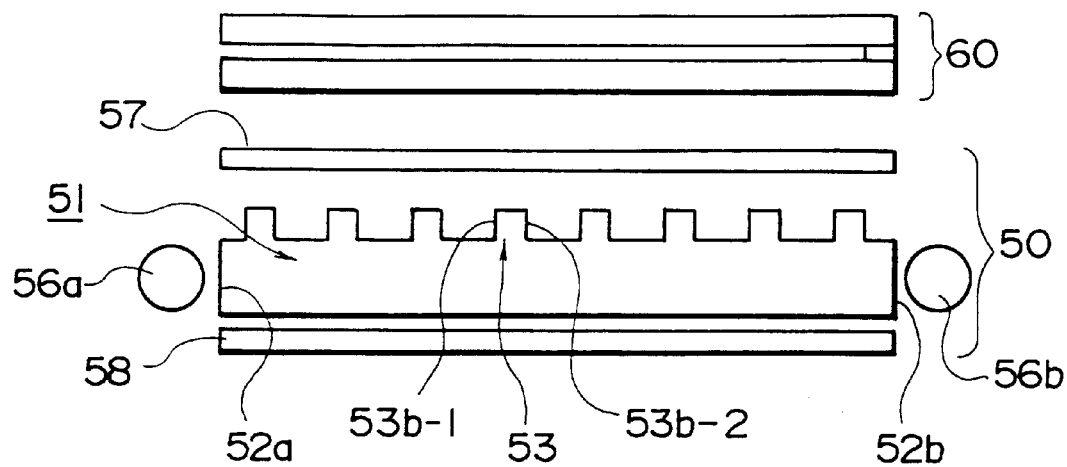
FIG. 5 is a sectional view of the liquid crystal display system as another embodiment of the present invention.

Embodiment 2 of the invention will now be described with reference to FIG. 5. A sectional view of the liquid crystal display system of this embodiment is shown in FIG. 5. The liquid crystal display system of this embodiment is similar to that of Embodiment 1, except that the light source is provided close to each end of the light guide and a mirror sheet is provided at the back of the light guide in Embodiment 2.

As shown in FIG. 5, a lighting apparatus 50 comprises cylindrical light sources 56a and 56b respectively provided close to end surfaces 52a and 52b of a light guiding body 51.

A mirror sheet 58 is provided at the back of the light guiding body 51 by depositing silver or aluminum. The mirror sheet 58 may be in contact with the light guiding body, or an air gap may be interposed between the mirror sheet 58 and the light guiding body. Note that a reflecting white sheet for irregular reflection is not preferable to be used in this case because such a white sheet does not have a high reflectance and the light will be reflected in various directions to lower the light directivity.

The function of the liquid crystal display system of this embodiment having above-described elements will be described below.

The light from the light sources 56a and 56b is input to the light guiding body 51 through the end surfaces 52a and 52b. After repeating the total internal reflection, the light is output from the side surfaces 53b-1 and 53b-2 of each projection 53. In this way, the light can be efficiently and uniformly output toward the prism array 57.

The research for the light guide by the inventors has clarified that both the angles $\delta_1$ and $\delta_2$ (shown in FIG. 3) between the light beams output from the side surfaces 53*b*-1 and 53*b*-2 of the projection 53 and the horizontal line are about 30°, and that the quantity of the light from the side surface 53*b*-1 is almost equal to that of the light from the side surface 53*b*-2. After passing through the prism array 57, the light is transmitted in a direction substantially perpendicular to the liquid crystal display panel 60. In order to output the light from the lighting apparatus 50 in a direction substantially perpendicular to the liquid crystal display panel 60, it is preferable that the apex angle θ of each prism of the prism array 57 is between 50° and 70°. If the angle θ is less than 50°, the light directivity becomes too high to lower the display quality. If the angle θ is more than 70°, the light cannot have required directivity and light intensity cannot be improved, and the light absorption due to the thickness of the prism array also lowers the light intensity.

As described, uniformly-distributed light can be output from the lighting apparatus 50 of this embodiment, and an improved light intensity can be obtained.

According to Embodiment 2, by providing two light sources and a mirror sheet, the lighting apparatus obtains advantages which is similar to Embodiment 1, and improved light directivity and intensity can be given. This realizes a wide viewing angle range for the display.

Embodiment 3

Figure 6:
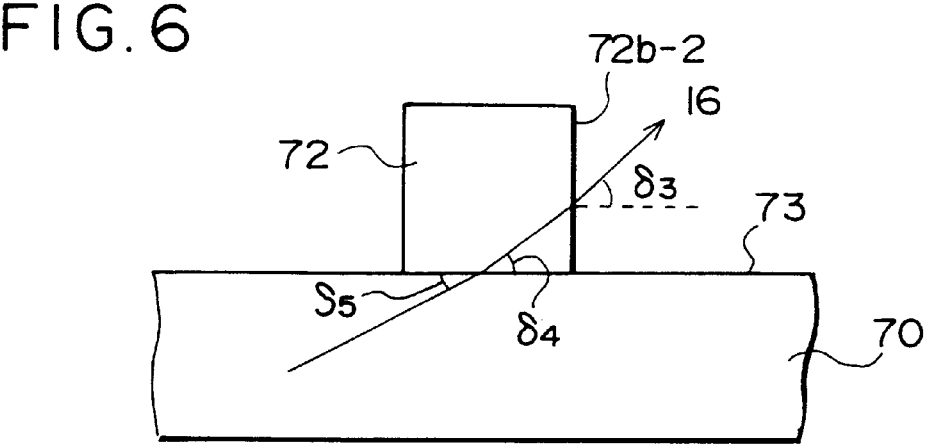
FIG. 6 is an enlarged sectional view showing an example of the projection on the light guide of the present invention.

Embodiment 3 of the invention will now be described with reference to FIG. 6. A sectional view of the light guide of the liquid crystal display system of this embodiment is shown in FIG. 6. The light guide of this embodiment is similar to the light guide of Embodiment 1, except that the light guiding body and the projections are formed of different materials in Embodiment 3.

As shown in FIG. 6, the projection 72 is formed of a material having a larger refractive index than the material of the light guiding body 70. The incident angle $\delta_5$ of the light which is input from the light guiding body 70 to the projection 72 with respect to the light-output-side surface 73 is smaller than the output angle $\delta_4$ of the light which is output from the light guiding body 70 with respect to the light-output-side surface 73 ($67_5 < \delta_4$). When the light 16 is input to the projection 72, the light is refracted ($\delta_5 < \delta_4$), and the light is further refracted when the light is output from the projection 72 through the side surface 72*b*-2. The angle $\delta_3$ of the finally-output light with respect to the light-output-side surface 73 is larger than 30° ($\delta_4 < \delta_3$). Note that the projection 72 may be formed by bonding above-described transparent film having a high refractive index on a transparent resin or glass plate.

In this embodiment, it is preferable that the apex angle θ of the prism array ranges from 60° to 70° in order to output the light from the lighting apparatus in a direction perpendicular to the liquid crystal panel. Therefore, a prism array having an apex angle of 90° which points to the liquid crystal display panel is not preferable for this embodiment because such prism array is designed to scatter the light.

With Embodiment 3, by forming the projections with a material having a larger refractive index than the material of the light guiding body, the light having an available maximum intensity can be controlled to be output at an angle of more than 30° with respect to the light-output-side surface. Thus the light can be output at a desired angle to obtain an improved intensity.

Note that all the projections may be formed of a material which has a different refractive index from the material of the light guiding body, or some of the projections may be formed of a material which has the same refractive index as the material of the light guiding body, if required.

Embodiment 4

Figure 7:
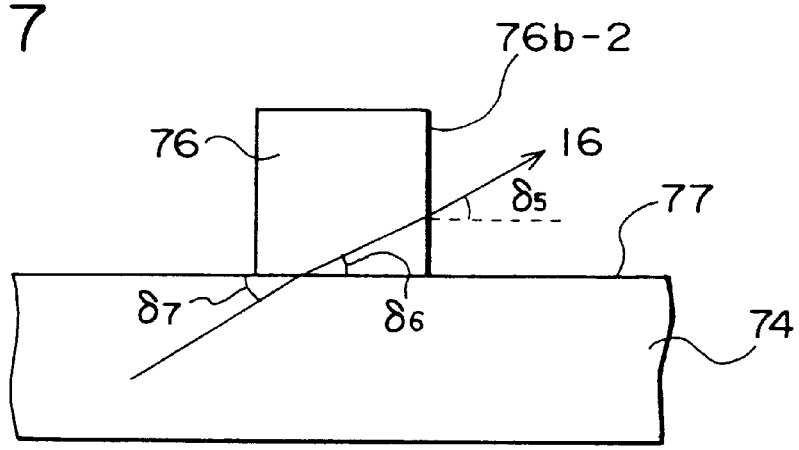
FIG. 7 is an enlarged sectional view showing another example of the projection on the light guide of the present invention.

Embodiment 4 of the invention will now be described with reference to FIG. 7. A sectional view of a light guide of the liquid crystal display system of this embodiment is shown in FIG. 7. The light guide of this embodiment is similar to the light guide of Embodiment 3, except the refractive indexes of the light guiding body and the projections.

As shown in FIG. 7, the projection 76 is formed of a material having a smaller refractive index than the material of the light guiding body 74. The incident angle $\delta_7$ of the light which is input from the light guiding body 74 to the projection 76 with respect to the light-output-side surface 77 is larger than the output angle $\delta_6$ of the light which is output from the light guiding body 74 with respect to the light-output-side surface 77 ($\delta_6 < \delta_7$). When the light 16 is input to the projection 76, the light is refracted ($\delta_6 < \delta_7$) when the angle $\delta_6$ is smaller than the angle $\delta_4$ in FIG. 6, and the light is further refracted when the light is output from the projection 76 through the side surface 76*b*-2. The angle $\delta_5$ of the finally-output light with respect to the light-output-side surface 77 is smaller than 30° ($\delta_6 < \delta_5$).

In this embodiment, it is preferable that the apex angle θ of the prism array is between 50° and 60° in order to output the light from the lighting apparatus in a direction perpendicular to the liquid crystal panel.

With Embodiment 4, therefore, by forming the projections with a material having a smaller refractive index than the light guiding body, the light having an available maximum intensity can be controlled to be output from the light guide at an angle which is smaller than 30° with respect to the light-output-side surface. Thus the light can be output at a desired angle to obtain an improved intensity.

Note that all the projections may be formed of a material having a refractive index which is smaller than that of the material of the light guiding body, or some of the projections may be formed of a material which has the same refractive index as the material of the light guiding body, if required. Alternatively, like the light guide 98 of FIG. 10C, for example, the light guide may comprise projections having a refractive index n which is equal to that of the light guiding body, projections having a refractive index $n_1$ which is smaller than n, and projections having a refractive index $n_2$ which is larger than n. Two types of projections having different refractive indexes may be arranged alternately in a row direction on the light guiding body, or may be arranged alternately in a column direction. Projections having three or more different refractive indexes may be arranged in order in a column direction. Depending on the pattern of arrangement of the projections, the light can be output from the projections at a desired angle.

Embodiment 5

Figure 8:
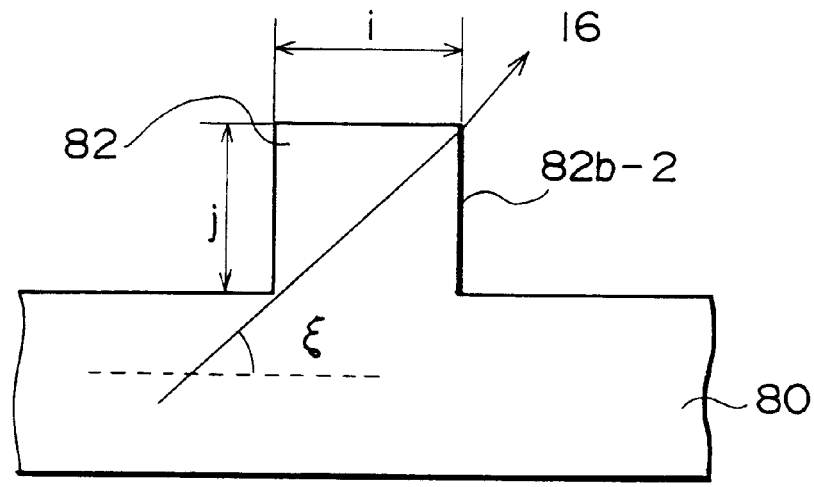
FIG. 8 is an enlarged sectional view showing still another example of the projection on the light guide of the present invention.
Figure 9:
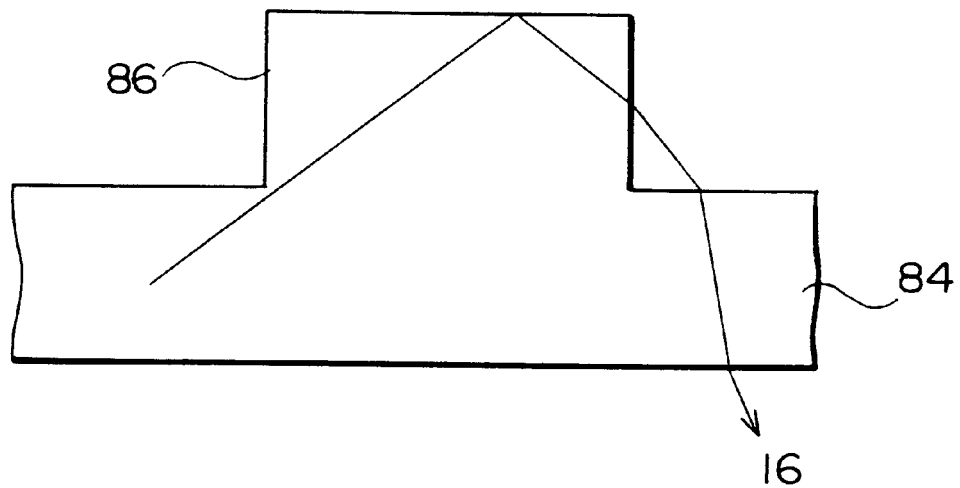
FIG. 9 is an enlarged sectional view showing a further example of the projection on the light guide of the present invention.

Embodiment 5 of the invention will now be described with reference to FIGS. 8 and 9. A sectional view of the light guide of the liquid crystal display system of this embodiment is shown in FIG. 8. A sectional view of another light guide is shown in FIG. 9. These light guides are similar to the light guide of Embodiment 1, except the size of the projection.

The light beam 16 which is input from the light source to the light guiding body 80 of the embodiment is reflected to have an angle ξ which is equal to or less than 45° with respect to a longitudinal axis of the light guiding body 80, for example. In this time, the width i and height j of the projection 82 have to be controlled such that the light 16 can pass through the side surface 82*b*-2 of the projection 82. When the angle ξ is 45°, it is preferable that the height j is larger than the width i.

In the case of the projection as shown in FIG. 9, since the width i is larger than the height j, the light 16 will be reflected to be output through the bottom surface of the light guiding body 84.

Therefore, when the ratio of the width i to the height j is much larger than 1/1, most of the light is reflected as shown by the light 16 of FIG. 9. Consequently, the ratio of the width i to the height j is preferably about 1/1. The projection having such size is easy to be manufactured.

Since the wavelength of visible light is about between 380 nm and 700 nm, the width i and the height j is preferably not less than about 5 μm in order to prevent occurrence of interference fringes due to the diffraction of light. Since the size of a pixel of the liquid crystal display panel is approximately between 200 μm and 300 μm, the width i and the height j is more preferably not more than about 100 μm in order to prevent occurrence of interference fringes due to the pixels. Moreover, in view of the manufacturing convenience, it is further preferable that the width i and the height j is approximately between 10 μm and 50 μm.

With Embodiment 5, therefore, by forming the width and height of the projection to have the ratio of about 1/1, the light which is reflected at the top surface of the projection (like the light 16 in FIG. 9) is reduced to improve intensity and utilization efficiency of the light. Moreover, by setting the width and height of the projection to be approximately between 10 μm and 50 μm, the manufacturing convenience is also improved.

Figure 11A:
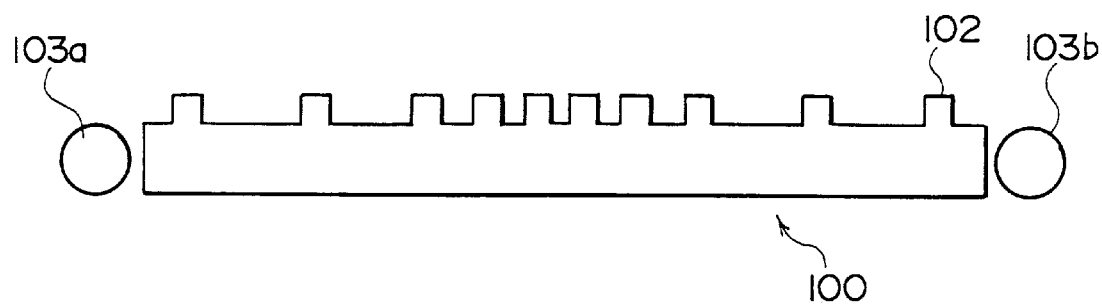
FIGS. 11A and 11B are sectional views showing additional examples of the light guide of the present invention.
Figure 11B:
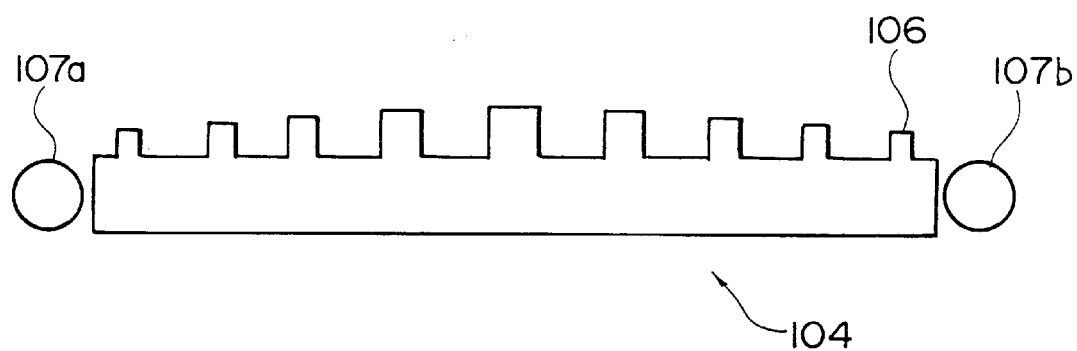

By controlling the density of the projections, or the number of the projections 82 per unit area on the light guiding body 80, the uniformity of the output light can be improved. In FIG. 11A, the projections 102 are arranged to have a lower density near the light sources 103*a* and 103*b*. In this case, the sizes of the projections 102 are equal. Alternatively, the uniformity of the output light may be improved by arranging the projections as shown in FIG. 11B, wherein the density of the projections 106 is uniform, but the size is varied. Note that the spacing between the projections 106 is uniform. Although the ratio of the width i to the height j is preferably i/j=1, the ratio may be i/j<1 to equalize the spacing between the projections.

Embodiment 6

Figure 10A:
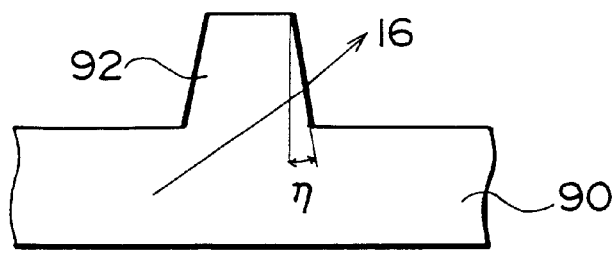
FIGS. 10A and 10B are enlarged sectional views showing still further examples of the projection on the light guide of the present invention.
Figure 10B:
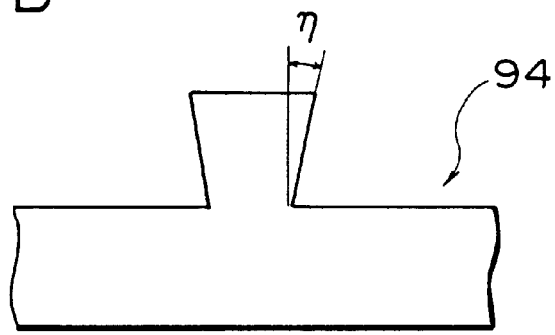
Figure 10C:
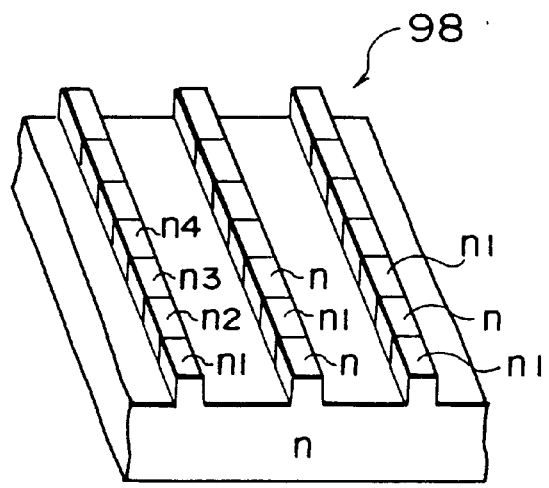
FIG. 10C is a perspective view showing an example of the light guide of the present invention.

Embodiment 6 of the invention will now be described with reference to FIGS. 10A and 10B. A sectional view of the light guide of the liquid crystal display system of this embodiment is shown in FIG. 10A. The light guide is similar to the light guide of Embodiment 1, except that the side surfaces of the projections are inclined.

As shown in FIG. 10A, the side surfaces of the projection 92 is tilted at an angle η which is equal to or less than 10° from the normal to the light-output-side surface.

When the angle η is larger than 10°, the light is diffused widely such that the light cannot be controlled by the prism array and the light intensity is reduced. When the angle η is equal to or less than 10°, however, the influence of the diffusion is substantially low. Further, such slightly-inclined side surfaces are advantageous to the manufacture of the projections by a method such as an injection molding. Note that also the angle of inclined side surfaces of the projections which are manufactured by a method such as etching or bonding a film on a transparent resin or glass plate is preferably equal to or less than 10° including the case as shown in FIG. 10B wherein the projection of the light guiding body 94 is tapered toward the bottom.

In order to output the light from the lighting apparatus in a direction perpendicular to the liquid crystal panel, the apex angle θ of the prism array has to be controlled to be in a range between 50° and 70° to obtain the optimum value.

With Embodiment 6, the side surfaces of the projections may be inclined to improve the manufacturing convenience, because the light intensity can be prevented from lowering if the angle of the inclined side surface with respect to the normal to the light-output-side surface is equal to or less than 10°.

Embodiment 7

Figure 12:
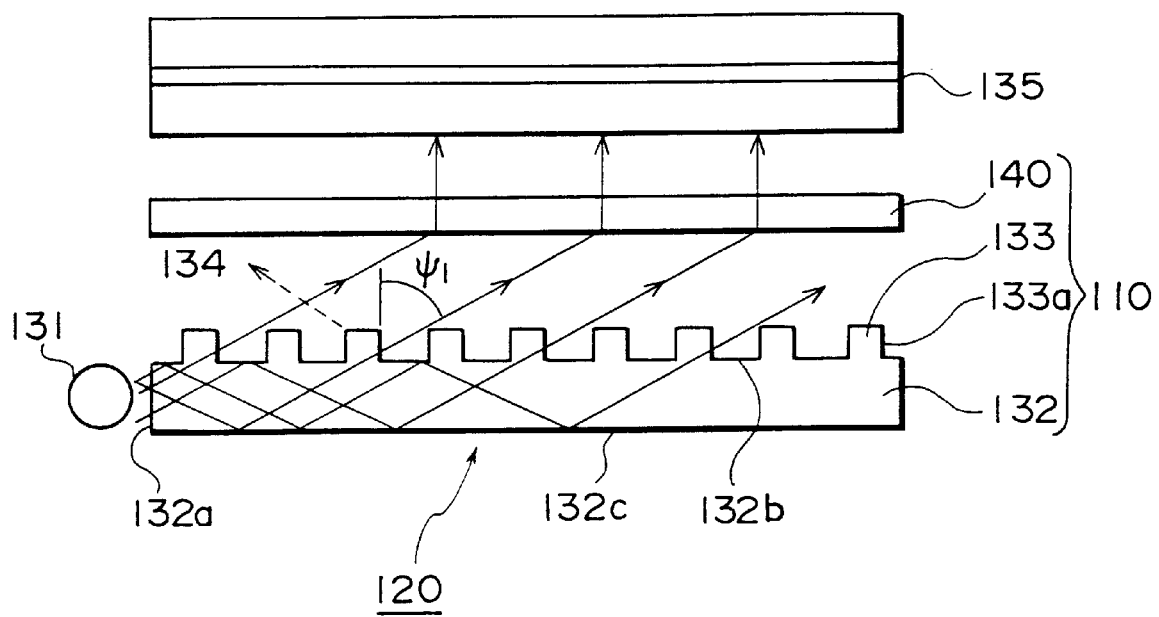
FIG. 12 is a sectional view of the liquid crystal display system as still another embodiment of the present invention.
Figure 13:
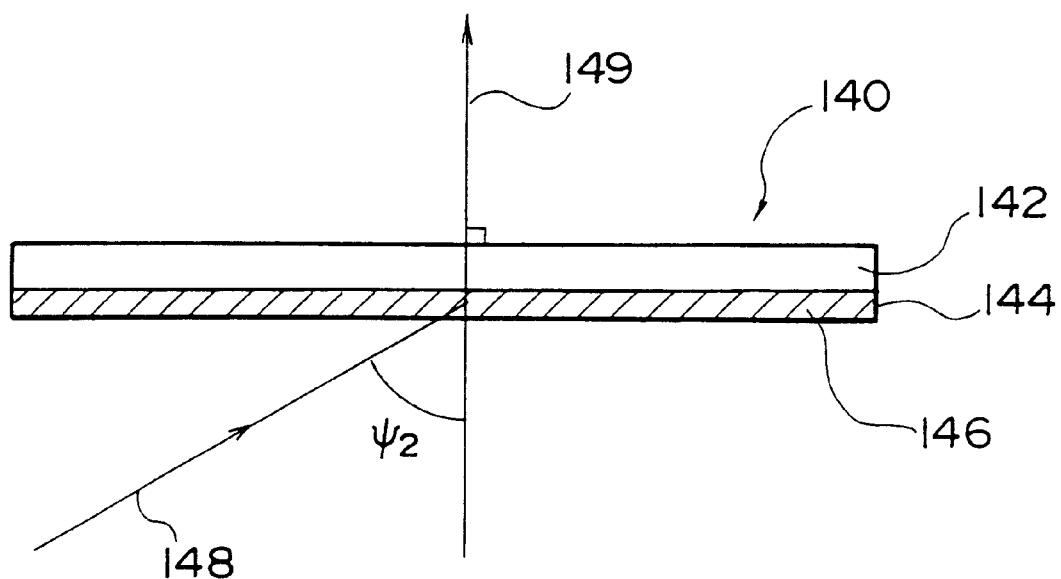
FIG. 13 is a sectional view showing an example of the directional change means of FIG. 12.

Embodiment 7 of the invention will now be described with reference to FIGS. 12 and 13. A sectional view of the liquid crystal display system of this embodiment is shown in FIG. 12. The liquid crystal display system of this embodiment is similar to that of Embodiment 1, except that the hologram element is used as the directional change means in Embodiment 7.

As shown in FIG. 12, the liquid crystal display system comprises a liquid crystal display panel 135 and a lighting apparatus 110. Note that polarizing plates which are usually provided at the front and back of the panel 135 are omitted in this figure.

The lighting apparatus 110 comprises a light guide 120, a light source 131, and a hologram element 140 or directional changing means which is provided to face a light-output-side surface 132*b* of the light guiding body 132 of the light guide 120 to change the direction of the light. Projections 133 are formed on the light-output-side surface 132*b*. Note that both the height and width of the projection 133 are 30 μm in this embodiment.

The hologram element which is a feature of the liquid crystal display system in this embodiment will now be described with reference to FIGS. 12 and 13. A sectional view of the hologram element is shown in FIG. 13.

The hologram element 140 is used to output the light in a direction substantially perpendicular to the liquid crystal display panel 135. The hologram element is provided between the light guide 120 and the liquid crystal display panel 135, as shown in FIG. 12.

The hologram element includes a glass plate 142 with a thickness of 1 mm and a photosensitive layer 144 which is made of a photosensitive material coated on the bottom surface of the glass plate 142. A diffraction grating structure 146 is recorded on the photosensitive layer 144 by the exposure method using two-beam interference. Input light 148 having a wavelength of 540 nm is input to the hologram element 140 at an incident angle $\psi_2$, which is 60° for example, with respect to the normal to the light-output-side surface of the hologram element 140. The input light is transmitted through the diffraction grating structure 146 to be output as a diffracted light 149 in a direction normal to the light-output-side surface of the hologram element 140 (at an angle of 0° with respect to the normal to the light-output-side surface).

The diffraction grating structure 146 diffracts the light which has been input at an oblique angle to the hologram element 140 to be output in a direction substantially perpendicular to the liquid crystal display panel 135. Note that the diffraction grating structure 146 is formed on a plane which is perpendicular to the sheet surface of FIG. 13.

Since diffraction efficiency of the hologram element 140 greatly depends on the incident angle of the light, especially in the case of a volume hologram element, most of the light which is input to the hologram element from the right side of FIG. 12 (light beam 134, for example, which has an incident angle of −60°) is not output toward the liquid crystal display panel 135.

As described, since the hologram element 140 depends on the incident angle unlike the prism array, the light from the light guiding body 132 requires improved directivity. Therefore, in this embodiment, the projection 133 on the light guiding body 132 has a box shape so that most of the light which has been input to the projection is output at an angle of about 60° with respect to the normal to the light-output-side surface of the light guiding body 132. Note that the light source 131 is provided close to one of the ends of the light guiding body.

Adding to the light having a wavelength of 540 nm, the light having a wavelength of blue color, red color or the like is also output from the light source 131. Since the hologram element 140 is designed for the light of 540 nm wavelength, the light having a wavelength other than 540 nm is not output at an angle of 0° with respect to the normal to the light-output-side surface of the hologram element, but at an angle within a range of about ±15° with respect to the normal to the light-output-side surface. So that almost no light is returned to the light guiding body 132 due to the total reflection unlike the prism array.

The function will be described below.

The light from the light source 131 is input to the light guiding body 132 through a light input surface 132a before repeating total internal reflection on the light-output-side surface 132b and a bottom surface 132c of the light guiding body 132. The light which reaches a side surface 133a of the projection 133 is then refracted to be output toward the liquid crystal display panel 135. The light which is output through the side surface 133a has improved directivity. Most of the light is output at an angle $\psi_1$, which is 60° for example, with respect to the normal to the light-output-side surface of the light guiding body 132, with a range of about ±10°.

With Embodiment 7, therefore, the hologram element which outputs the light in a direction substantially perpendicular to the liquid crystal display panel can simplify the design work for the liquid crystal display panel.

Note that the diffraction grating structure of the hologram element may be a structure formed by the exposure method using two-beam interference, on a photosensitive layer which is coated on a transparent plate such as a glass plate, wherein the transmittance or the refractive index in the diffraction grating is regularly changed.

Embodiment 8

Figure 14:
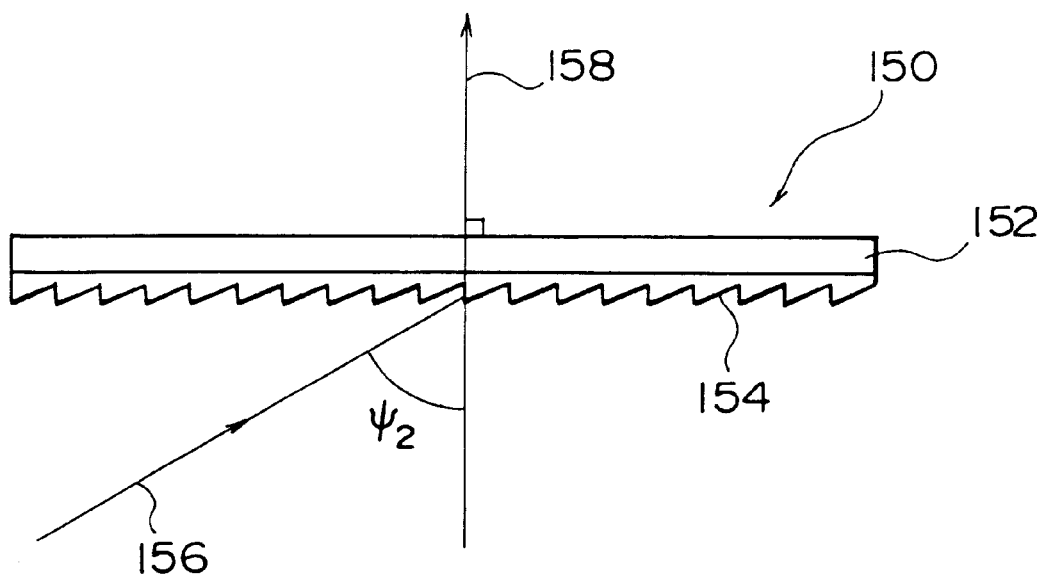
FIG. 14 is a sectional view showing another example of the directional change means used in the liquid crystal display system of the present invention.

Embodiment 8 of the invention will now be described with reference to FIG. 14. A sectional view of the directional change means of the liquid crystal display system of this embodiment is shown in FIG. 14. The liquid crystal display system is similar to that of Embodiment 7 except a structure of the directional change means.

As shown in FIG. 14, the directional change means 150 of this embodiment comprises a glass plate 152 having a thickness of 2 mm and a blazed grating 154 which is formed of a resin molded by the replication method using photopolymer on the glass plate 152 to have a sawtooth vertical section.

Input light 156 having a wavelength of 540 nm is input to the directional change means at an angle $\psi_2$, which is 60° for example, with respect to the normal to the light-output-side surface of the directional change means 150. The input light 156 is then diffracted by the blazed grating 154 to be output as a diffracted light 158 in a direction normal to the light-output-side surface of the directional change means 150 (at an angle of 0° with respect to the normal to the light-output-side surface). Note that the light guide or the like which is not shown in the figure is similar to that of Embodiment 7.

Other type of directional change means may be used if the directional change means has a function of a prism. Not only a glass plate, but a transparent resin plate or a transparent resin film may be used as a base plate of the directional change means.

Note that the light guiding body does not necessarily require the projections, if it has an ability to improve the light directivity. A diffraction grating structure may be designed to be appropriate to the light directivity.

Embodiment 9

Figure 15:
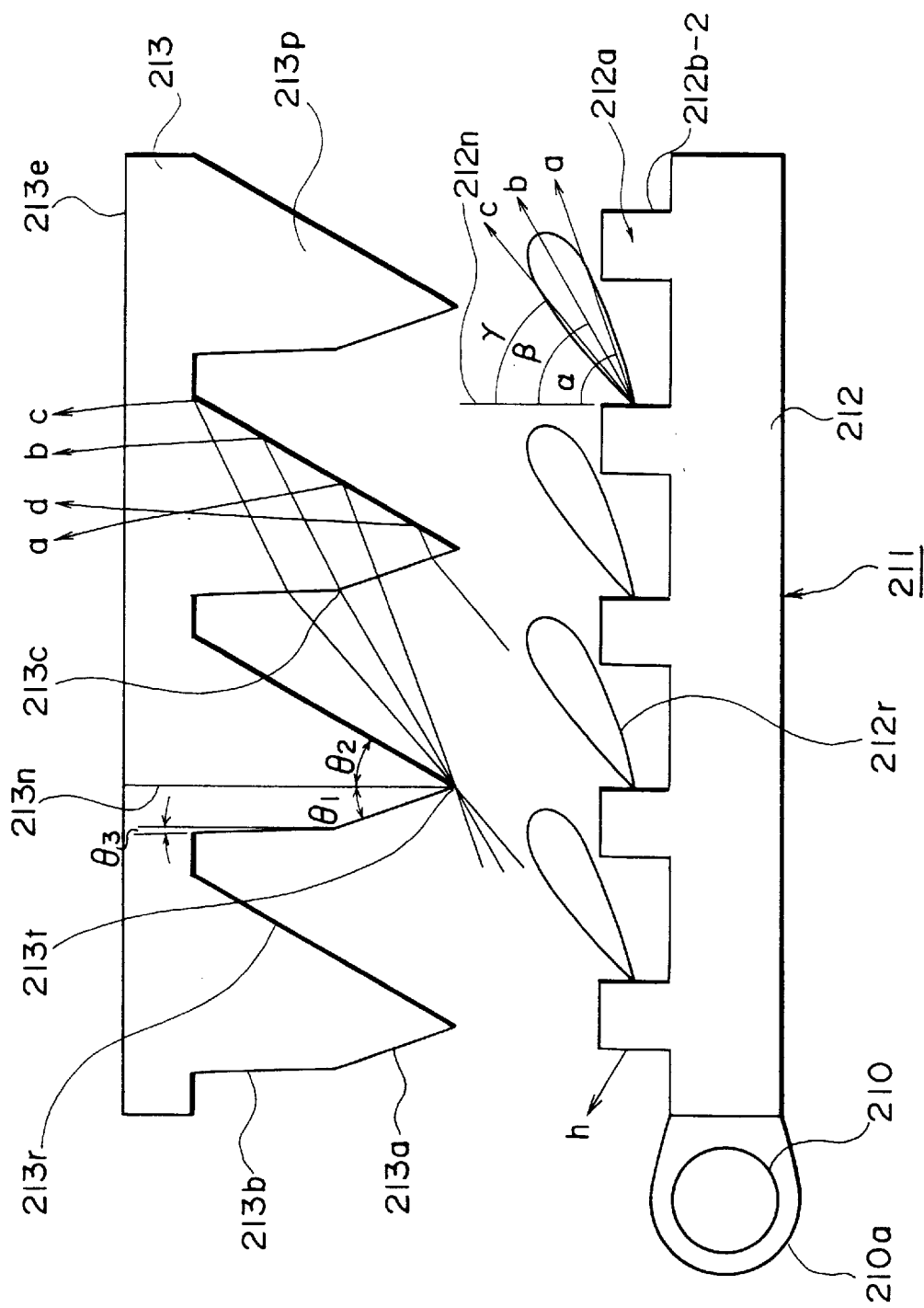
FIG. 15 is a sectional view showing an example of the prism array used in the lighting apparatus of the present invention, illustrating optical paths.

Embodiment 9 of the invention will now be described with reference to FIG. 15. A sectional view of the prism array used in the lighting apparatus of this embodiment is shown in FIG. 15. The lighting apparatus is similar to that of Embodiment 1 except a structure of the prism array.

Figure 18A:
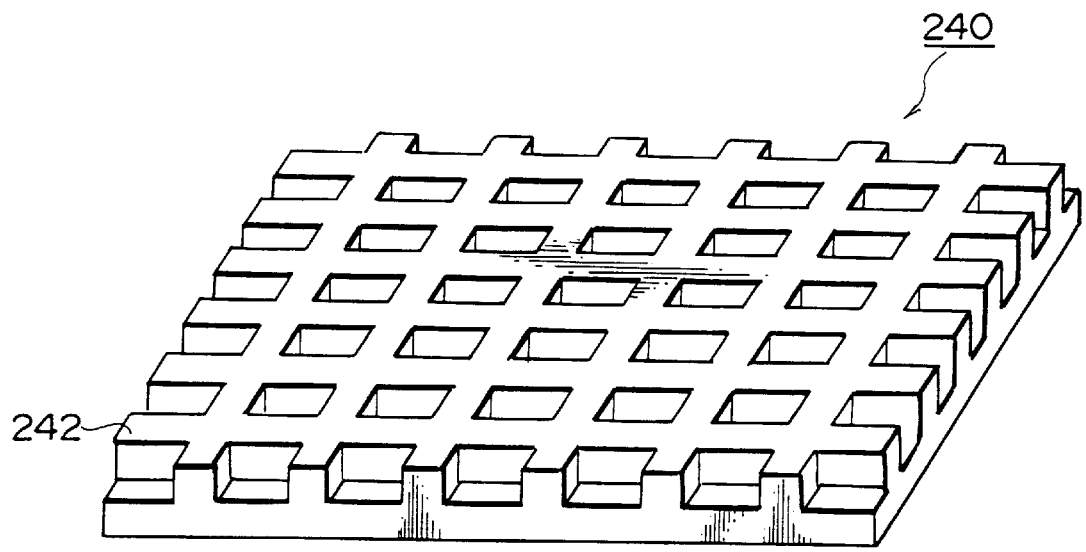
FIG. 18A is a perspective view showing another example of the light guide of the present invention.
Figure 18B:
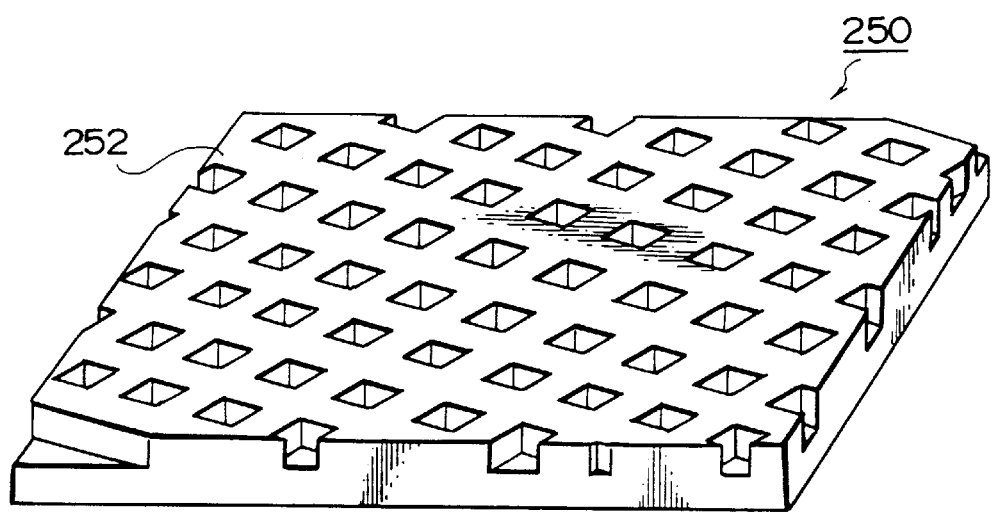
FIG. 18B is a perspective view showing still another example of the light guide of the present invention.

As shown in FIG. 15, the lighting apparatus comprises a light source 210, a light guide 211, a reflecting mirror 210a which reflects the light from the light source 210 efficiently toward the light guide 211, and a prism array 213 which is provided to face the light guide 211. The light guide includes a light guiding body 212 and projections 212a formed on the light guiding body. A diameter of circular ends of the cylindrical light source 210 is 2.4 mm, a thickness of the light guiding body 212 is 2 mm, and a width and a height of each of the projections 212a are 30 µm, for example. Although the projections 212a are extended in a direction perpendicular to the sheet surface of FIG. 15, projections having a pattern of a grating or net as shown in FIGS. 18A and 18B may be used.

Input light which reaches a side surface 212b-2 of the projection 212a is then refracted to be output toward the prism array 213. Output light 212r from the side surface 212b-2 has improved directivity. Most of the output light 212r is output at an angle β, which is 60° for example, with respect to the normal 212n to the light-output-side surface of the light guiding body 212, with a range of ±10°. Output angles α, β and γ of light beams a, b and c with respect to the normal 212n in FIG. 15 are respectively 70°, 60° and 50°, for example. Note that the light intensity at the side surface becomes large farther from the light source 210, and that the light h which is output from the side surface of the projection 12a is weak when the side surface faces the light source.

The light beams a, b and c are output from a light output surface 213e of the prism array at angles of 15°, 5° and 7°, respectively, with respect to the normal 213n to the light output surface 213e, and a light beam d which has been output from the projection at the angle γ is then output from the light output surface at an angle of −5° (when counterclockwise angles are positive in FIG. 15).

The structure of the prism array 213 will now be described in detail with reference to FIG. 15.

The prism array 213 is provided between the light guide 211 and the liquid crystal display panel to output the output light 212r in a direction substantially perpendicular to the liquid crystal display panel. The prism array 213 formed by injection-molding or casting transparent resin such as acrylic resin comprises a plurality of prisms 213p and the flat light output surface 213e. Each of the prisms 213p extends in a direction perpendicular to the sheet surface of FIG. 15. The thickness of the prism array 213 is 300 µm, for example.

Each of the prisms 213p has light input surfaces 213a and 213b which are first surfaces for receiving the light, and a second surface 213r which reflects the light due to the total internal reflection.

The light input surface 213a has an angle $\theta_1=20°$ with respect to the normal 213n to the light output surface 213e, and the light input surface 213b is substantially parallel to the normal 213n. The second surface 213r has an angle $\theta_2=30°$ with respect to the normal 213n. A pitch of the prisms 213p is about 50 µm, and the thickness of each prism 213p is about 55 µm.

The light beam b which has the angle $\beta=60°$ passes through an apex 213t of one of the prisms 213p and then input to an adjacent prism through an intersection 213c of the light input surface 213a and 213b.

The function of the prism array of this embodiment will be described below.

The light beams a, b and c are output from the light guide 211 to be input to one of the prisms 213p. The light beam a passes through the apex 213t, then is refracted at the light input surface 213a, and is reflected at the second surface 213r by the total internal reflection to be output in a direction substantially perpendicular to the light output surface 213e.

The light beam c passes through the apex 213t, then is refracted at the light input surface 213b, and is reflected at the second surface 213r by the total internal reflection to be output in a direction substantially perpendicular to the light output surface 213e.

The light beam d having the angle γ does not pass through the apex 213t when it is input to one of the prisms 213p. The light beam d is then refracted at the light input surface 213a, and is reflected at the second surface 213r by the total internal reflection to be output in a direction substantially perpendicular to the light output surface 213e.

An angle $\theta_3$ between the light input surface 213b and the normal 213n is smaller than the angle $\theta_1$ between the light input surface 213a and the normal 213n. In other words, the light input surface 213b is substantially perpendicular to the light output surface 213e in order to refract the light beam c having the output angle γ larger than the light beams a and b and transmit toward the second surface 213r. If the light input surface 213b is tilted at an angle which is equal to the angle $\theta_1$ of the light input surface 213a, the light beam c would reach the light output surface 213e directly, and be reflected by the total internal reflection to be returned to the light guide 211.

With Embodiment 9, there are following advantages.

(1) Since the light from the light guide can be transmitted efficiently in a direction substantially perpendicular to the liquid crystal display panel with improved directivity, a bright display can be provided.

(2) Since most of the light from the prism array is output in a direction substantially perpendicular to the light output surface, the light is also substantially perpendicular to the liquid crystal display panel. Therefore, when the panel is viewed at an oblique angle, the display looks dark. If some light diffusing means is provided, the display viewed at an oblique angle becomes bright.

(3) Most of the light which is output from the prism array 213 is output in a direction substantially perpendicular to the light output surface 213e. If a polarizing beam splitter is provided between the prism array 213 and the liquid crystal display panel, only given polarized light can pass through it. The light which is reflected at the polarizing beam splitter will be again reflected at the prism array or the light guide, and the direction of the light vibrations will be changed. Finally the light can pass through the polarizing beam splitter to increase the light quantity, so that brighter light can be provided for the liquid crystal display system.

Embodiment 10

Figure 16:
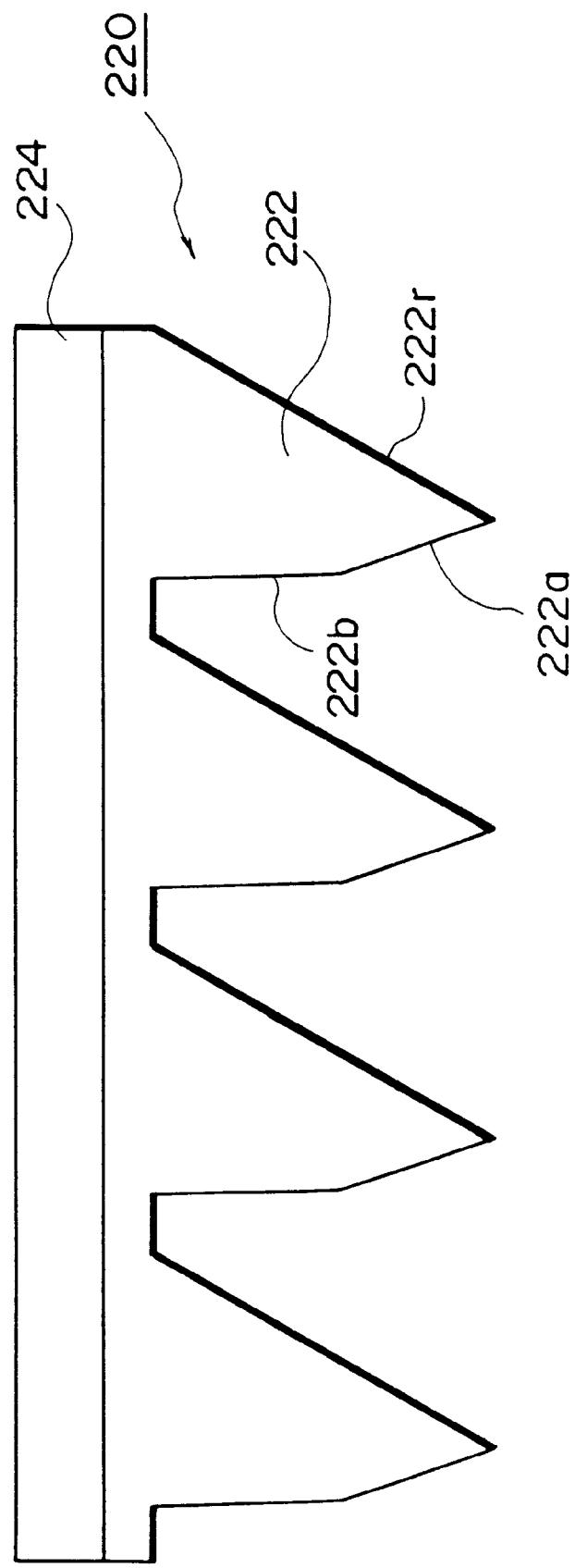
FIG. 16 is a sectional view showing another example of the prism array of the present invention.

Embodiment 10 of the invention will now be described with reference to FIG. 16. A sectional view of a prism array used in a lighting apparatus of this embodiment is shown in FIG. 16. The structure of the prism array is different from that of Embodiment 9.

A prism array 220 of this embodiment includes a plurality of prisms 222 which are formed by transfer-molding acrylic light-curing resin on a polyester film 224 having a thickness of 150 µm. Such method improves the manufacturing convenience.

Each of the prisms 222 has light input surfaces 222a and 222b and a second surface 222r. These surfaces may be inclined at angles described in Embodiment 9, and the angles may be controlled depending on directivity of the light from the light guide.

Moreover, these surfaces of the prism are not necessarily required to be flat. They may be curved like the surfaces 234a, 234b and 232 of the prism array 230 in FIG. 17.

Figure 17:
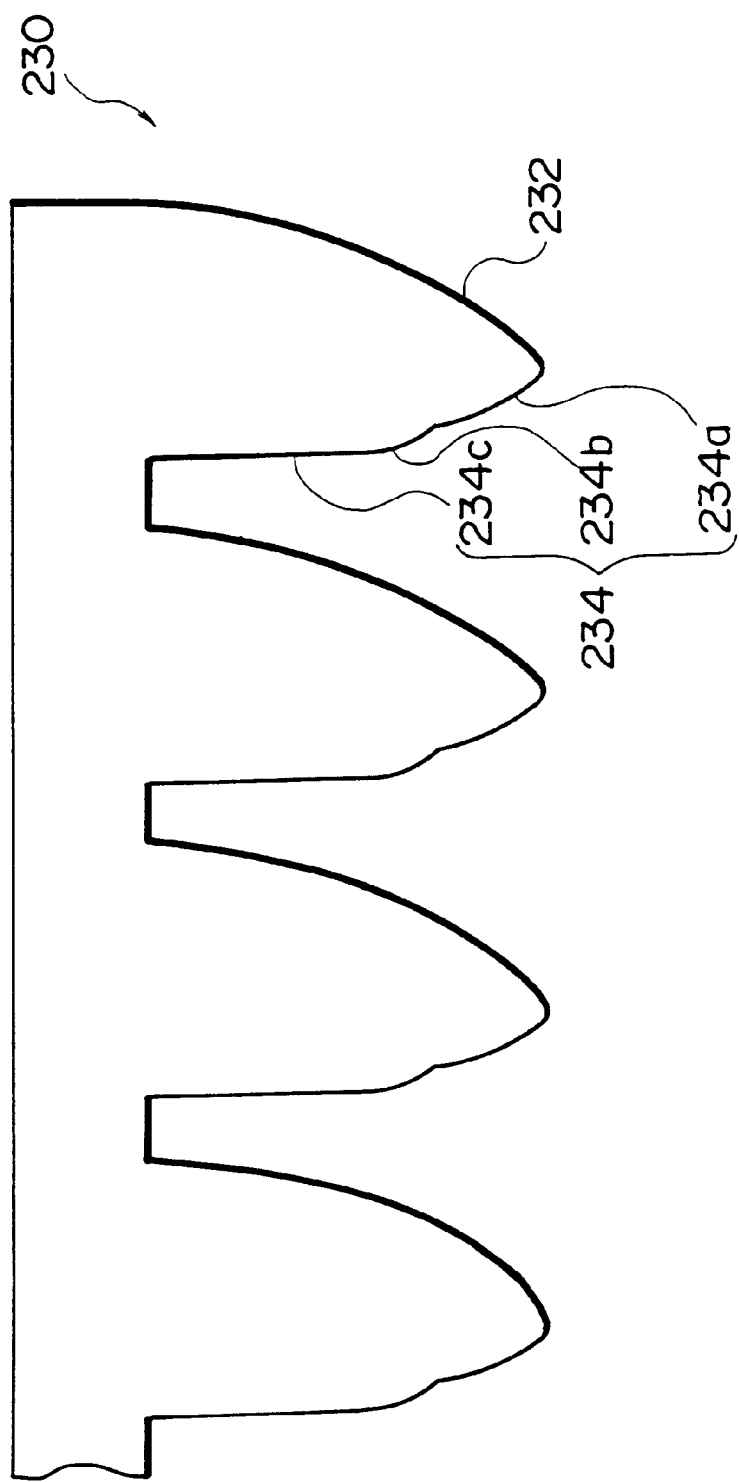
FIG. 17 is a sectional view showing still another example of the prism array of the present invention.

In this embodiment there are two light input surfaces, but there may be three or more light input surfaces as shown by the surfaces 234a, 234b and 234c of the prism array in FIG. 17.

Note that the projections of the light guide are not necessarily required to be box-shaped, if the projections can output the light with improved directivity.

Embodiment 11

Figure 19:
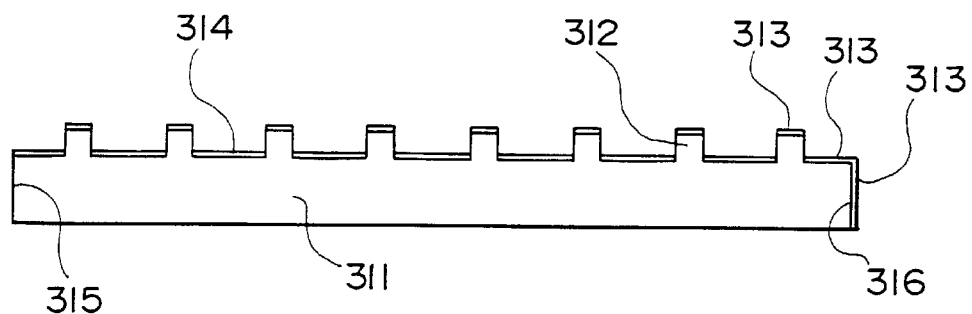
FIG. 19 is a sectional view showing a further example of the light guide of the present invention.
Figure 20:
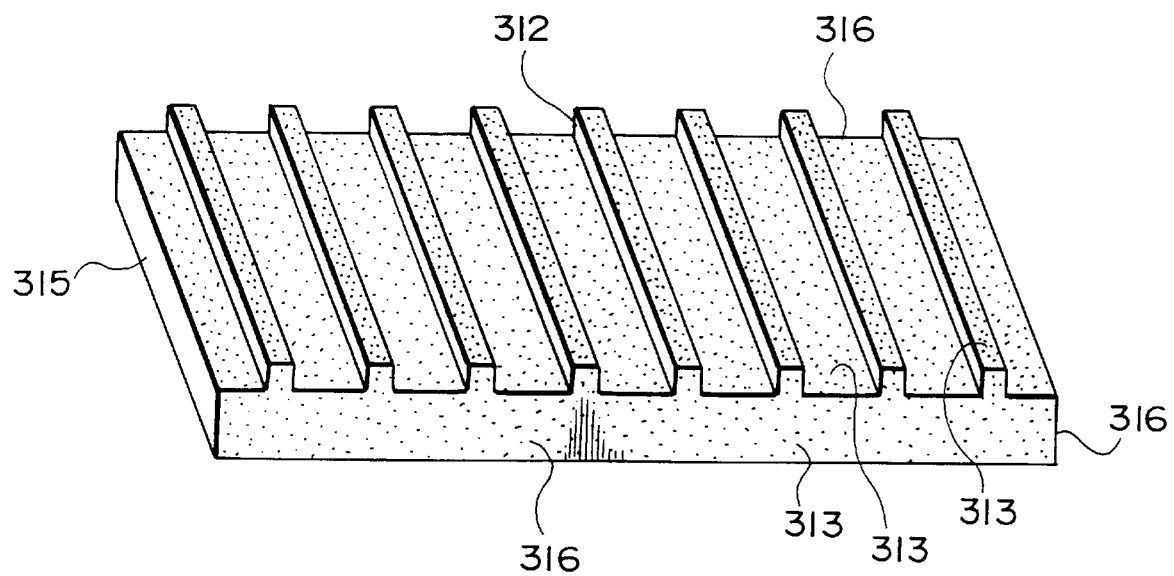
FIG. 20 is a perspective view of the light guide of FIG. 19.

Embodiment 11 of the invention will now be described with reference to FIGS. 19 to 22. A sectional view of a light guide of this embodiment is shown in FIG. 19. The light guide is similar to that of Embodiment 1 except that there is provided a reflection layer on the projections in this embodiment.

As shown in FIG. 19, a light guide 311 comprises a plurality of projections 312 arranged on a the light-output-side surface 314. The projections are parallel to each other and to a light input surface 315. Each of the projections 312 has a top surface which is substantially parallel to the light-output-side surface 314 and side surfaces which are substantially perpendicular to the light-output-side surface 314.

A reflection layer 313 which is formed of a thin aluminum film is provided on the light-output-side surface 314 and the top surfaces 312a of the projections 312. The reflection layer 313 covers also side surfaces 316 of the light guide 311 except the light input surface 315.

Figure 21:
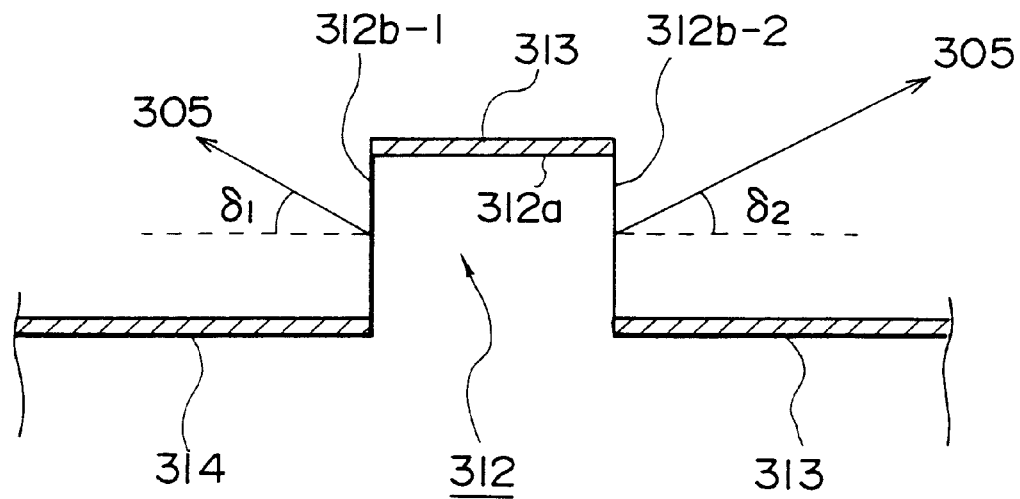
FIG. 21 is a sectional view schematically showing the light output from the light guide of FIG. 19.

The research for the light guide by the inventors has clarified that light 305 is output only from side surfaces 312b-1 and 312b-2 of the projection 312, as shown in FIG. 21. Because of the total internal reflection, most of the light which reaches the top surface 312a or the light-output-side surface 314 is reflected, even if the reflection layer 313 is not provided. However, the side surfaces 316 (shown in FIG. 20) of the light guide 311 except the light input surface require the reflection layer 313.

Figure 22:
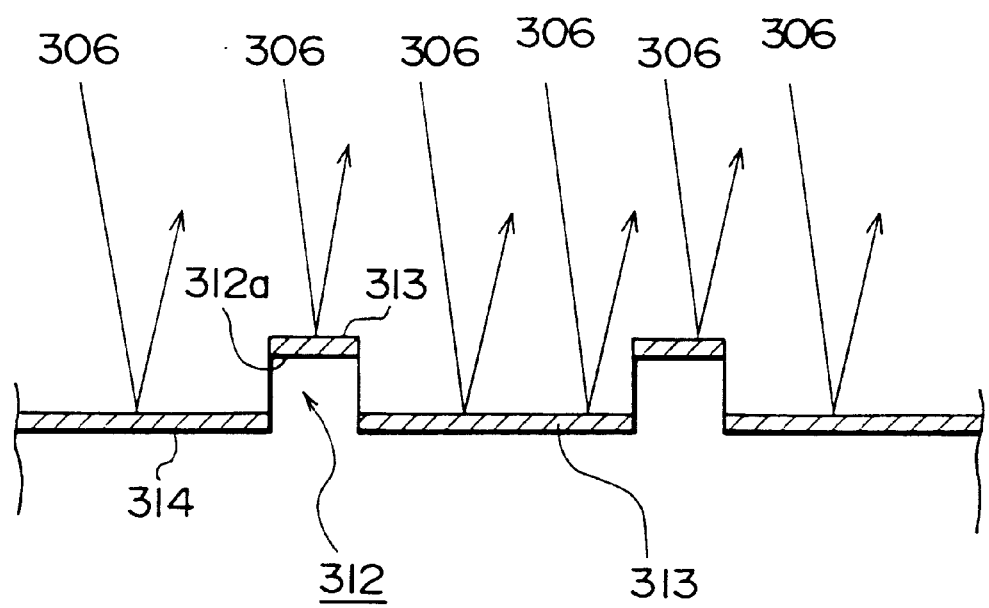
FIG. 22 is a sectional view schematically showing a light reflecting function of the light guide of FIG. 19.

The light 306 which comes from outside of the light guide is reflected by the reflection layer 313 provided on the light-output-side surface 314 and the top surfaces 312a of the projections 312, as shown in FIG. 22. Consequently, most of the light 306 can be utilized efficiently unlike a conventional transflector (semitransparent plate).

Embodiment 12

Figure 23:
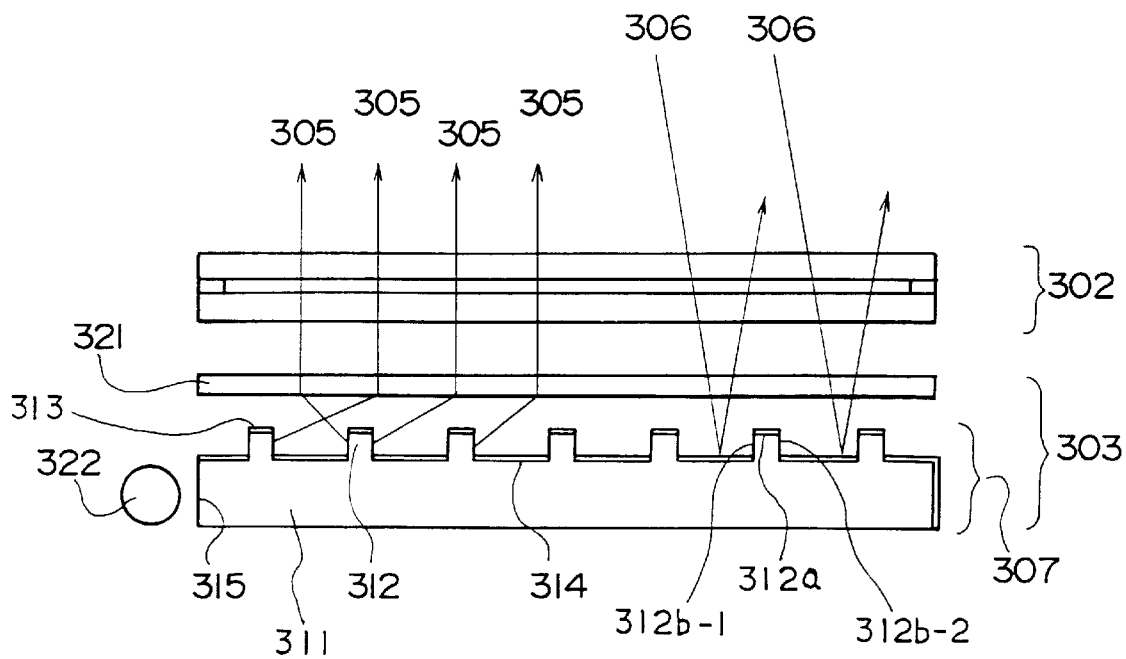
FIG. 23 is a sectional view of the liquid crystal display system as a further embodiment of the present invention.
Figure 24:
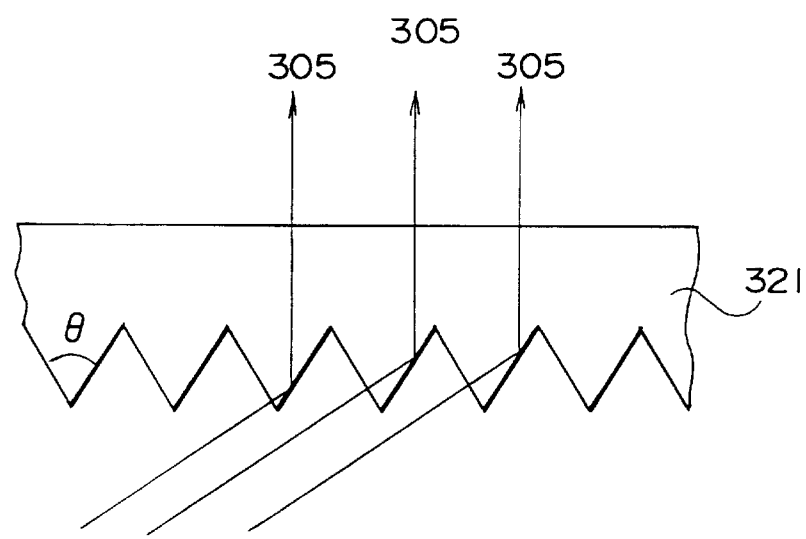
FIG. 24 is a sectional view schematically showing the light output from the lighting apparatus of FIG. 23.
Figure 25:
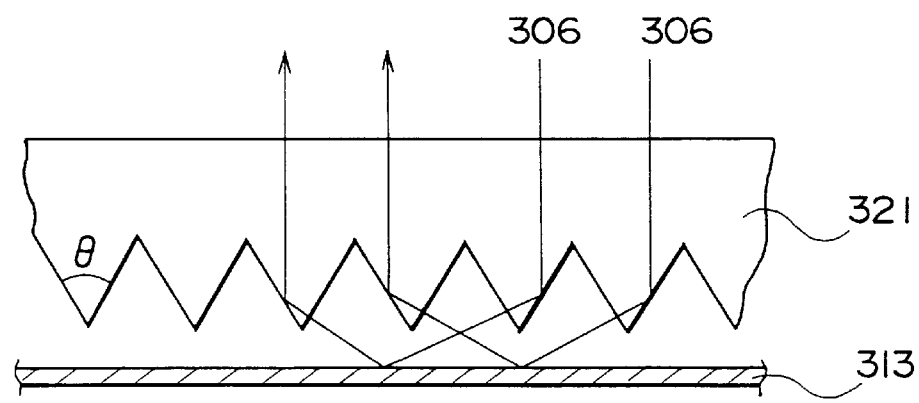
FIG. 25 is a sectional view schematically showing light reflection in the lighting apparatus of FIG. 23.

Embodiment 12 of the invention will now be described with reference to FIGS. 23 to 25. A sectional view of a liquid crystal display system of this embodiment is shown in FIG. 23. The light guide of Embodiment 11 is used in the liquid crystal display system of this embodiment.

As shown in FIG. 23, the liquid crystal display system of this embodiment comprises a liquid crystal display panel 302 and a lighting apparatus 303. The lighting apparatus 303 includes a light source 322, a light guide 307, and a prism array 321.

There is input light 305 which will now be described below.

The light source 322 is provided close to one of the ends of the light guide 307. Most light from the light source is input to the light guide 307 through a light input surface 315 by reflecting means (not shown). The input light 305 repeats the total internal reflection to be output only from the side surfaces of the projections 312.

After passing through the prism array 321, the input light 305 is output in a direction substantially perpendicular to the liquid crystal display panel 302. As shown in FIG. 24, the apex angle 6 of each prism of the prism array 321 is preferably between about 50° and 70° in order to make the direction of the input light 305 substantially perpendicular to the liquid crystal display panel 302.

The light 306 (shown in FIG. 23) which comes from the outside of the liquid crystal display system will be described next. An example of light transmission when the light 306 has been perpendicularly input through the liquid crystal display panel 302 is shown in FIG. 25.

After passing through the liquid crystal display panel 302, the light 306 is input to the lighting apparatus 303. The light 306 passes through the prism array 321 before reflecting by the reflection layer 313 which is formed on the light-output-side surface of the light guide 307. The reflected light 306 again passes through the prism array 321 to be output in a direction perpendicular to the liquid crystal display panel 302. When the light passes through the liquid crystal display panel 302, a displayed image can be viewed. Because of the reflection layer 313, the light 306 can be reflected with a small loss. Even if the light 306 is not perpendicular to the liquid crystal display panel, the light 306 can be reflected with a small loss.

As described, when the outside light is provided enough, the liquid crystal display system of Embodiment 12 can utilize reflected light of the outside light instead of the light source of the display system to provide a sufficient light intensity. Such liquid crystal display system with small power consumption can be suitably applied to portable digital assistants or the like.

Embodiment 13

Figure 26:
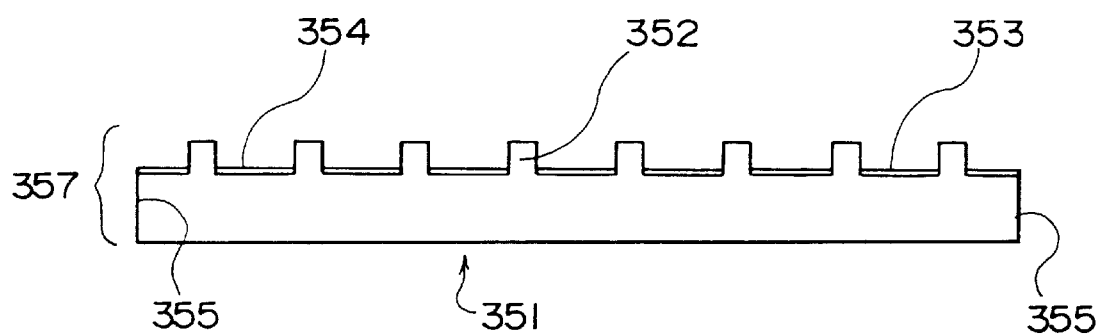
FIG. 26 is a sectional view showing another example of the light guide of the present invention.

Embodiment 13 of the invention will now be described with reference to FIG. 26. A sectional view of a light guide used in a liquid crystal display system of this embodiment is shown in FIG. 26. The light guide of this embodiment is similar to that of Embodiment 12 except that the reflection layer is provided only on the light-outside-surface and does not cover the projections in this embodiment.

As shown in FIG. 26, projections 352 are arranged on a light-output-side surface 354 of a light guiding body 351. A reflection layer 353 which is formed of a thin silver film is provided only on the light-output-side surface 354 and does not cover the projections 352.

The research for the light guide by the inventors has clarified that light from the light source is output from side surfaces of the projections 352 when the light source is provided close to each end of the light guiding body. Because of the total internal reflection, most of the light which reaches top surfaces of the projections 352 and the light-output-side surface 354 is reflected and is not output wastefully even if there is not the reflection layer 353.

Since the reflection layer 353 on the light-output-side surface 354 can reflect outside light, most of the light from outside can be utilized efficiently unlike a conventional transflector (semitransparent plate). An area of the projections 352 is very small in comparison with the light-output-side surface 354, so that the reflection layer's ability to reflect light is not affected by the projections.

Moreover, the reflection layer can improve utilization efficiency of the light which is input to the light guide.

Embodiment 14

Figure 27:
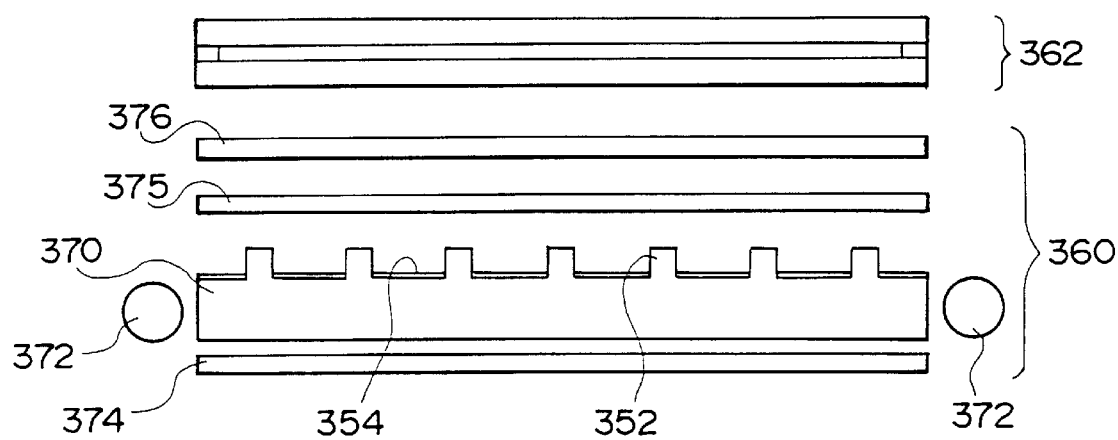
FIG. 27 is a sectional view of the liquid crystal display system as a still further embodiment of the present invention.

Embodiment 14 of the invention will now be described with reference to FIG. 27. A sectional view of a liquid crystal display system of this embodiment is shown in FIG. 27. The liquid crystal display system is similar to that of Embodiment 13 except that a light diffusion sheet, reflecting mirror sheet, and two light sources are provided in this embodiment.

As shown in FIG. 27, the liquid crystal display system comprises a liquid crystal display panel 362 and a lighting apparatus 360.

The lighting apparatus 360 includes light sources 372, a light guide 370, a prism array 375, a light diffusion sheet 376, and a reflecting mirror sheet 374. The light sources 372 are placed close to the ends of the light guide 370. The reflecting mirror sheet 374 can be formed by depositing silver or aluminum at the back of the light guide 370. The reflecting mirror sheet 374 may be in contact with the light guide 370, or a thin air gap may be interposed between the light guide 370 and the reflecting mirror sheet 374. Note that a reflecting white sheet for irregular reflection is not preferable to be used in this case because such a white sheet does not have a high reflectance and the light will be reflected in various directions to lower the light directivity.

The light from the light sources 372 is input to the light guide 370 through light input surfaces. After repeating the total internal reflection, the light is output from the side surfaces of the projections 352 toward the prism array 375.

The direction of the light is then changed by the prism array 375 to be output in a direction substantially perpendicular to the light output surface of the prism array. After that, the light passes through the light diffusion sheet 376 to be uniformly diffused. In this way, the liquid crystal display panel is provided with a wide viewing angle range. The light from two light sources is thus efficiently changed into uniformly-distributed light.

Light from outside passes through the liquid crystal panel 362 to be input to the lighting apparatus 360. After passing through the light diffusion sheet 276 and the prism array 375, the light is reflected by a reflection layer 353 which is formed on the light-output-side surface 354 of the light guide 370. The light again passes through the prism array 375 and the light diffusion sheet 376, and then is input to the liquid crystal display panel 362. When the light passes the liquid crystal display panel 362, a displayed image can be viewed. Because of the reflection layer, the light can be utilized with a small loss to provide bright display.

Embodiment 15

Figure 28:
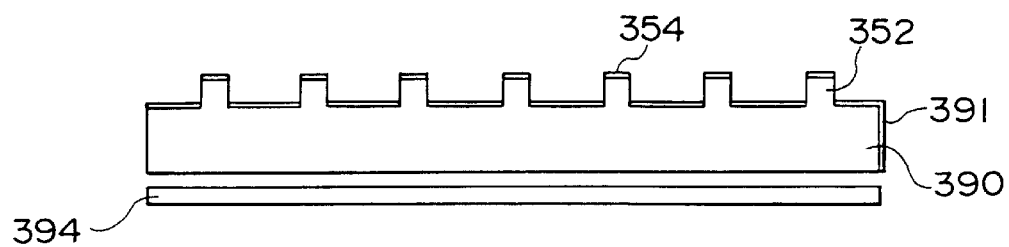
FIG. 28 is a sectional view showing still another example of the light guide of the present invention.

Embodiment 15 of the invention will now be described with reference to FIG. 28. A sectional view of a light guide used in a liquid crystal display system of this embodiment is shown in FIG. 28. The light guide is similar to that of Embodiment 14 except an area covered by a reflection layer.

In the light guide having a similar structure to that of Embodiment 12, a reflection layer 353 is provided on side surfaces 391 of the light guiding body 390 except the light input surface to utilize the input light efficiently.

Projections 352 are arranged on a light-output-side surface 354 of the light guiding body 390. The reflection layer 353 which is formed of a thin aluminum film is further provided on a top surface of each projection 352 and the light-output-side surface 354.

The research for the light guiding body by the inventors has clarified that most of the light from the light source is output from the projections through the side surfaces which do not face the light source at an angle of about 30° with respect to the light-output-side surface of the light guiding body. Part of the light from the light source is reflected by the reflection layer on an opposite side surface to the light input surface of the light guiding body and then output from the projections through the side surfaces which face the light source at an angle of about 30° with respect to the light-output-side surface of the light guiding body.

Most of the light from the light source is output from the side surfaces of the projections 352. Because of the total internal reflection, most of the light which reaches the top surface and the light-output-side surface is reflected and is not output wastefully, even if the reflection layer 353 is not provided. However, the side surfaces of the light guiding body except the light input surface require the reflection layer 353.

Since the reflection layer 353 on the light-output-side surface and the top surfaces of the projections 352 can reflect outside light, most of the light from outside can be utilized efficiently unlike a conventional transflector (semitransparent plate). Moreover, the reflection layer can improve utilization efficiency of the light which is input to the light guide.

Embodiment 16

Figure 29:
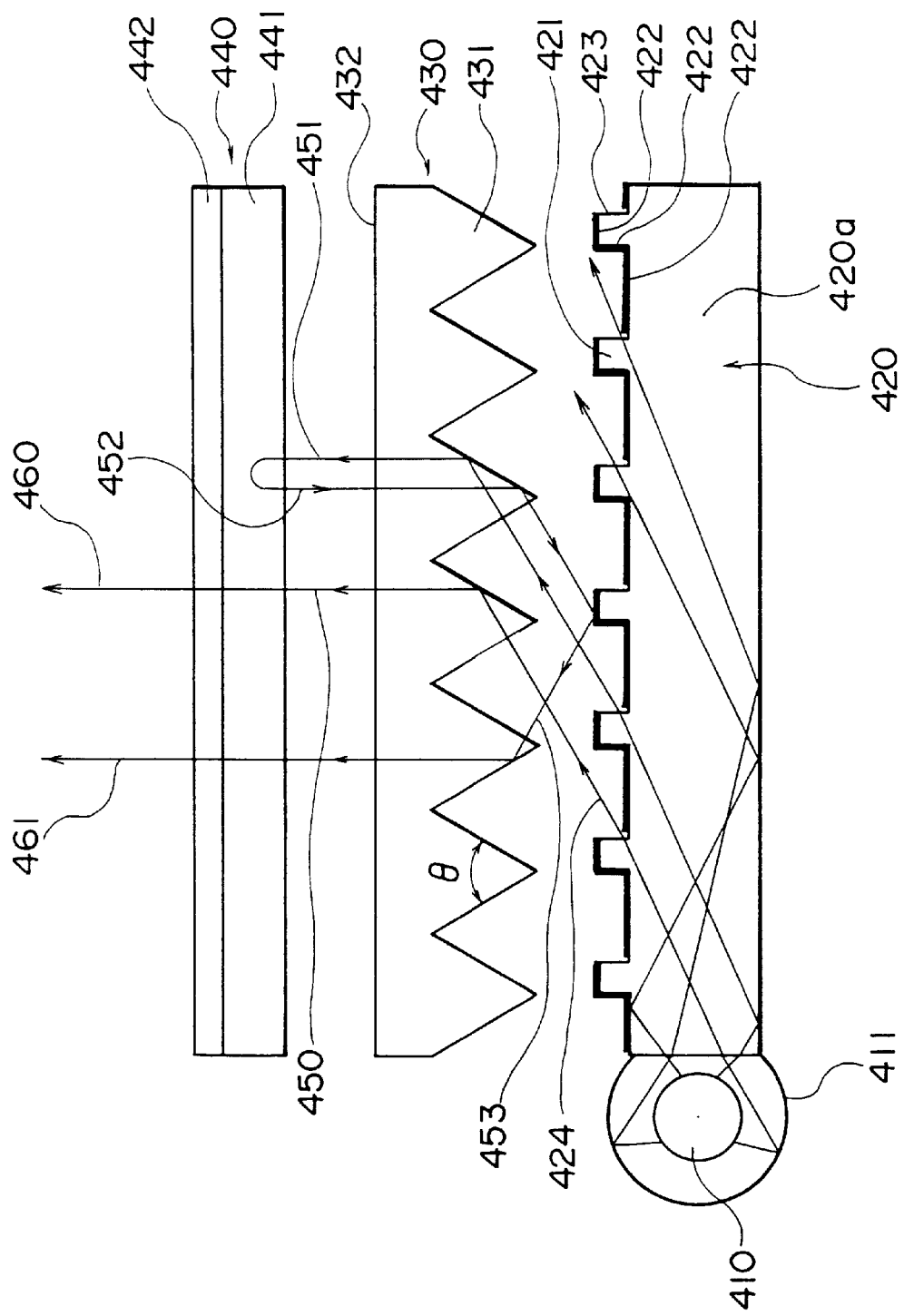
FIG. 29 is a sectional view of the lighting apparatus as another embodiment of the present invention.

Embodiment 16 of the invention will now be described with reference to FIG. 29. A sectional view of a lighting apparatus of this embodiment is shown in FIG. 29. The lighting apparatus is similar to that of Embodiment 1 except light polarizing means and a reflection layer which is provided on the projections of the light guide.

As shown in FIG. 29, the lighting apparatus comprises a cylindrical light source 410, a reflecting mirror 411, a light guide 420 having projections 421, a prism array 430, and light polarizing means or a polarizer 440. The diameter of circular ends of the light source 410 is 2.4 mm, and the length of straight sides of the light source is 130 mm. The reflecting mirror 411 is placed to surround the light source 410 and is formed by depositing silver on a film. The light guide includes a light guiding body 420a which has a thickness of 3 mm, a length of 160 mm, and a width (the measurement in a direction perpendicular to the sheet surface) of 120 mm.

The projections 421 are provided on the light guiding body 420a of the light guide to face the prism array 430. Both the height and width of each projection 421 is 30 μm. A vertical section of each projection is not limited to a rectangle, but is preferably a trapezoid in view of easy release of a mold for the light guide 420 including the projections 421.

A reflection layer 422 is provided on the light-output-side surface of the light guiding body 420a and the projections 421 except side surfaces 423 of the projections 421, when the side surfaces 423 do not face the light source 410. The reflection layer 422 is formed by depositing aluminum, silver, or the like. To avoid the side surfaces 423, the deposition is done from a direction not facing the side surfaces 423.

The prism array 430 which is placed between the light guide 420 and a liquid crystal display panel (not shown) receives light 424 from the light guide and outputs it in a direction substantially perpendicular to the liquid crystal display panel. The prism array 430 comprises a flat output surface 432 and a plurality of prisms 431.

An apex angle θ of each prism 431 is appropriately set such that the direction of the light 424 can be changed to a direction perpendicular to the flat output surface 432. As shown in FIG. 29, the angle θ is 60°, for example. The light 424 is output from the light guide 420 at an angle of 60° with respect to the normal to the light-output-side surface, and then the direction of the light 424 is changed by the prism array to a direction perpendicular to the flat output surface 432.

The angle θ in this case is 60°, but the angle θ may be any degrees if it is set in view of an output angle of the light from the light guide. By controlling the angle θ, the prism array 430 can change the direction of the light from the light guide to a direction perpendicular to the flat output surface 432.

The polarizer 440 comprises a cholesteric liquid crystal layer 441 and a quarter wave film 442 which generates retardation by a quarter wavelength and is provided on the cholesteric liquid crystal layer.

The handedness of the helical structure of the cholesteric liquid crystal in the cholesteric liquid crystal layer 441 is levorotatory (left-handed) in this embodiment. Therefore, dextrorotatory (right-handed) circularly-polarized light within the light input to the cholesteric liquid crystal layer 441 can pass through the cholesteric liquid crystal layer 441 and be converted into linearly-polarized light 460 by the quarter wave film 442.

Levorotatory circularly-polarized light is reflected by the cholesteric liquid crystal layer 441 to be transmitted to the reflection layer 422 through the prism array 430. The light is again reflected at the reflection layer 422 to be returned to the prism array 430, and then the direction of the light is changed by the prism array 430 to be output to the polarizer 440 again.

When the levorotatory circularly-polarized light 452 is reflected at the reflection layer 422, the direction of rotation is changed to dextrorotatory, and the now dextrorotatory circularly-polarized light is again input to the polarizer 440 to pass through the cholesteric liquid crystal layer 441, and it is converted into linearly-polarized light 461 by the quarter wave film 442.

In this way, the light which cannot pass through the polarizer 440 is reflected to be converted by the reflection layer 422. The converted light is returned to the polarizer 440 and now passes it. When the light passes through the polarizer 440, the light is again converted into linearly-polarized light by the quarter wave film 442.

The function of the lighting apparatus will be described below.

The light from the light source 410 is directly input to the light guiding body 420a through the light input surface, or is reflected by the reflecting mirror 411 before being input. The input light repeats the total internal reflection on the light-output-side surface and the bottom surface of the light guiding body 420a.

When the light reaches the side surface 423 of the projection 421, the light is refracted to be output toward the prism array 430 as output light 424. The output light 424 has improved directivity. Most of the output light 424 is output at an angle of 60° with respect to the normal to the light-output-side surface, with a range of about ±10°.

The output light 424 is then output in a direction perpendicular to the flat output surface 432 of the prism array 430 toward the polarizer 440.

Dextrorotatory circularly-polarized light 450 within the light input to the polarizer 440 can pass through the cholesteric liquid crystal layer 441 and be converted into linearly-polarized light 460 by the quarter wave film 442.

Levorotatory circularly-polarized light 451 within the light input to the polarizer 440 is reflected by the cholesteric liquid crystal layer 441 to be transmitted to the reflection layer 422 through the prism array 430 as reflected levorotatory circularly-polarized light 452. Then the light 452 is again reflected by the reflection layer 422 to be returned to the prism array 430. On reflection at the reflection layer 422, the reflected levorotatory circularly-polarized light 452 is converted into dextrorotatory circularly-polarized light 453 to be again input to the polarizer 440 through the prism array 430. The light 453 passes through the cholesteric liquid crystal layer 441, and it is converted into linearly-polarized light 461 by the quarter wave film 442.

As described, following advantages can be obtained by Embodiment 16.

Generally, the direction of rotation of circularly-polarized light which can pass through a cholesteric liquid crystal layer is limited. When only dextrorotatory circularly-polarized light can pass through a cholesteric liquid crystal layer, for example, the levorotatory circularly-polarized light is reflected. The reflected levorotatory circularly-polarized light is usually returned to a light guide to be diffused by a diffusing plate. Then only dextrorotatory circularly-polarized light within the diffused light can pass through the cholesteric liquid crystal layer. Thus the conversion efficiency of the reflected light is low in this case.

In the present invention, however, the reflection layer is formed of metal which has a high reflectance, so that the levorotatory circularly-polarized light can be reflected and converted into dextrorotatory circularly-polarized light by the reflection layer. The converted light is again input to the polarizer and now can pass through it. In this way, the light from the light source is efficiently converted into linearly-polarized light to improve the light intensity. The reflection layer also improves utilization efficiency of the input light.

Embodiment 17

Figure 30:
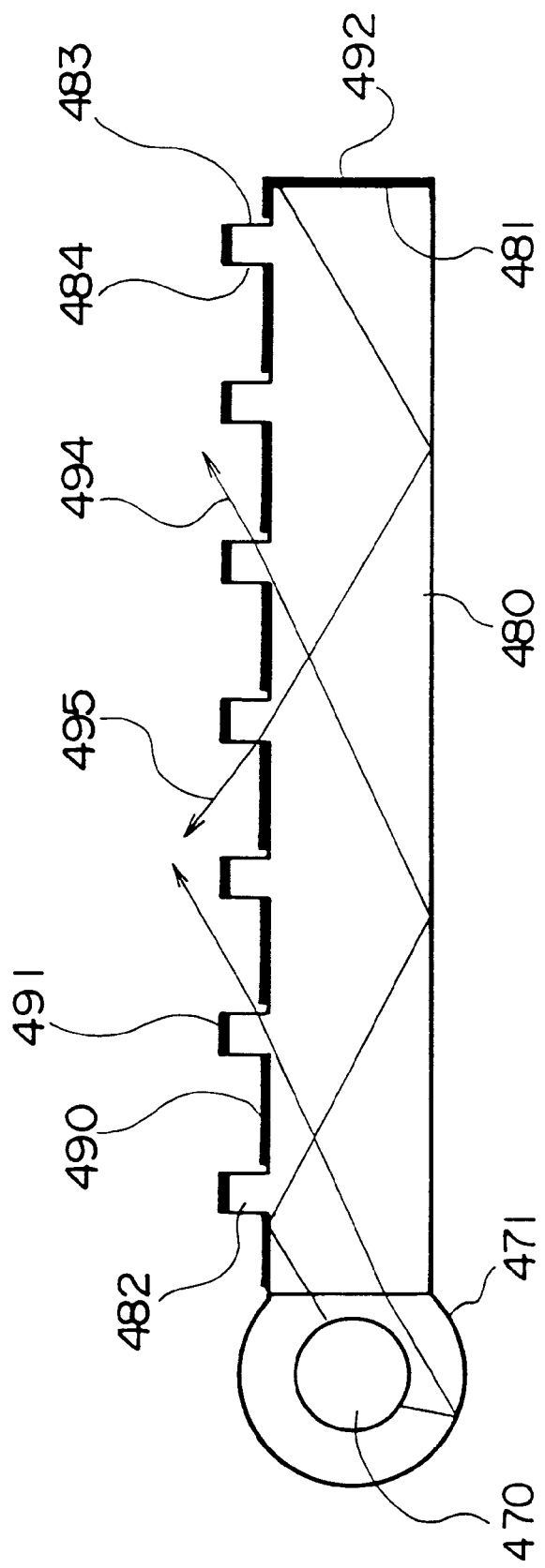
FIG. 30 is a sectional view showing an additional example of the light guide used in the lighting apparatus of the present invention.

Embodiment 17 of the invention will now be described with reference to FIG. 30. A sectional view of a light guide used in a lighting apparatus of this embodiment is shown in FIG. 30. The lighting apparatus is similar to that of Embodiment 16 except the reflection layer.

In FIG. 30, only a part of the lighting apparatus is shown because other elements are similar to those of Embodiment 16 in FIG. 29.

The light guide of this embodiment comprises a light guiding body 480, projections 482, a reflection layer 490 provided on the light-output-side surface of the light guiding body 480, a reflection layer 491 provided on top surfaces of the projections 482, and a reflection layer 492 provided on an end surface 481 of the light guiding body 480, when the end surface 481 does not face the light source 470. The projections 482 have side surfaces 484 which face the light source. Unlike Embodiment 16, side surfaces 484 are not provided with a reflection layer. The reflection layers 490 and 491 are formed by depositing metal such as aluminum on the projections and light-output-side surface from a vertical direction and by etching for a short time to remove only a thin metal layer on the side surfaces 483 and 484 of the projections.

The functions of the lighting apparatus of this embodiment will be described below.

Light 494 which is output from the light source 470 and does not reach the end surface 481 is output from projections 482 through the side surfaces 483 which do not face the light source in the same manner as Embodiment 16.

Part of light transmitted to the light guiding body 480 reach the end surface 481 to be reflected in a reverse direction to that of the light 494.

The light 495 which has been transmitted in a reverse direction to that of the light 494 is output from the projections 482 through the side surfaces 484. The light 495 is very weak in comparison with the light 494, but has more improved directivity than that of the light 494. The directions of most of the light 495 and most of the light 494 are symmetrical with respect to the planes perpendicular to the light-output-side surface of the light guiding body 480 and the sheet surface of the figure.

The light output from the light guide is transmitted toward the directional change means and polarizing means in the same way as Embodiment 16. Part of the light 494 and 495 is reflected by the polarizer, returned to the reflection layers 490 and 491 to be reflected again, and then returned to the polarizer.

Embodiment 18

Embodiment 18 of the invention will now be described with reference to FIG. 31. A sectional view of a liquid crystal display system of this embodiment is shown in FIG. 31, when the liquid crystal display system comprises the lighting apparatus of Embodiment 16.

Figure 31:
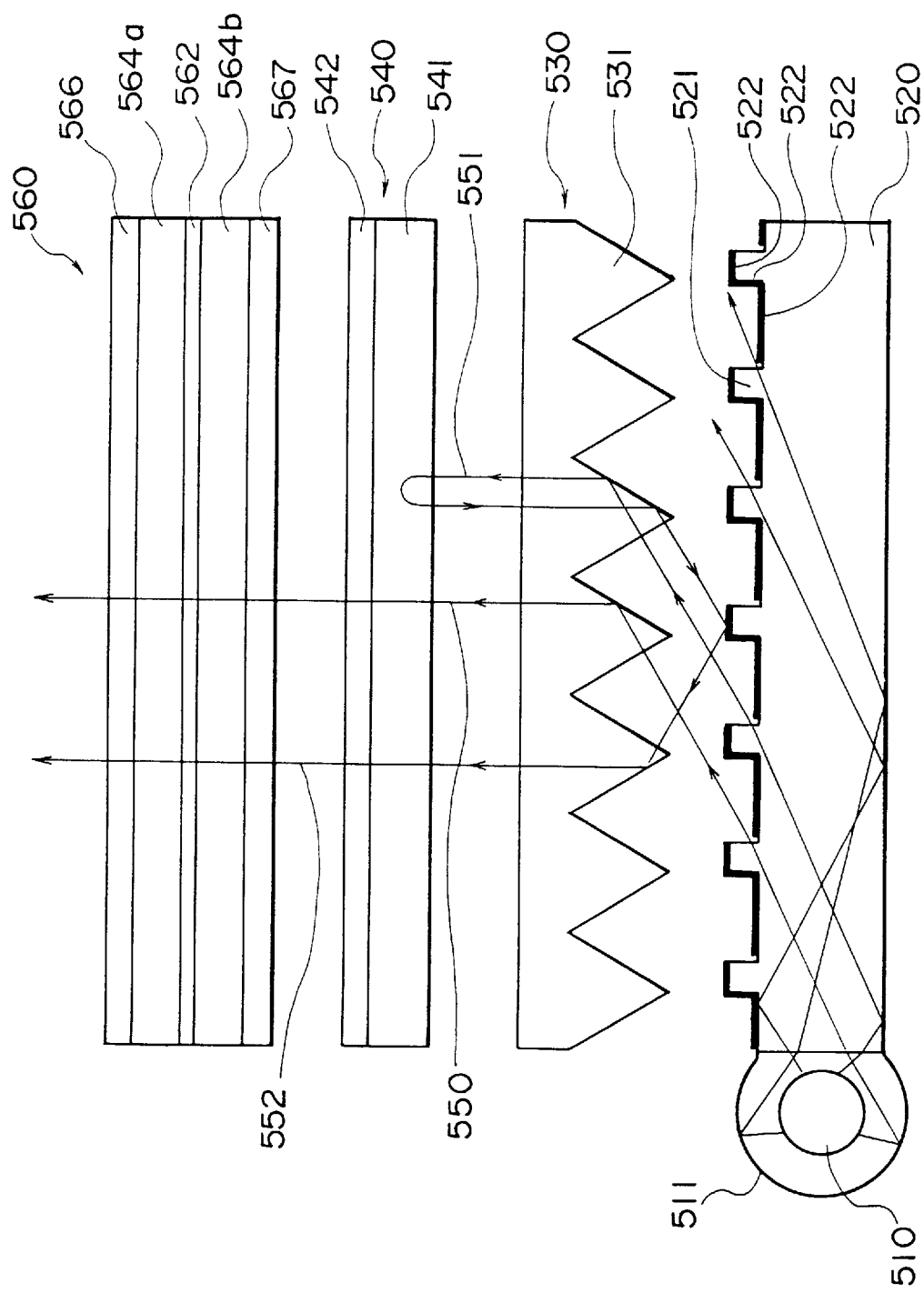
FIG. 31 is a sectional view of the liquid crystal display system as still another embodiment of the present invention.

As shown in FIG. 31, the liquid crystal display system comprises a liquid crystal display panel 560 and a lighting apparatus. The liquid crystal display panel 560 includes a liquid crystal layer 562, substrates 564a and 564b which support the liquid crystal layer 562 between themselves and have circuits for driving the liquid crystal layer 562, a polarizing plate 567 which is provided to face the substrate 564b, and a polarizing plate 566 which is provided to face the substrate 564a. The lighting apparatus comprises a light source 510, a reflecting mirror 511, a light guide 520 having projections 521 and reflection layer 522, a prism array 530, and polarizer 540.

The polarizer 540 has a quarter wave film 542. The direction of the optic axis of the quarter wave film 542 is the same as the direction of vibration of the light which can pass through the polarizer 540. Linearly-polarized light 552 has a direction of vibration which is inclined at an angle of 45° from the sheet surface of FIG. 31 and can pass through the polarizer 540. The transmission axis of the polarizing plate 567 is also inclined at an angle of 45° from the sheet surface of FIG. 31.

Light 550 passes through the quarter wave film 542 to be converted into linearly-polarized light 552. The linearly-polarized light 552 is then transmitted to the polarizing plate 567. When the direction of the transmission axis of the polarizing plate 567 is identical to the direction of vibration of the linearly-polarized light 552, the light 552 is hardly absorbed by the polarizing plate 567 and most of the light can passes through it. Therefore, the light can be efficiently transmitted to the liquid crystal display panel 560 to improve the brightness of the liquid crystal display system.

Embodiment 19

Figure 32:
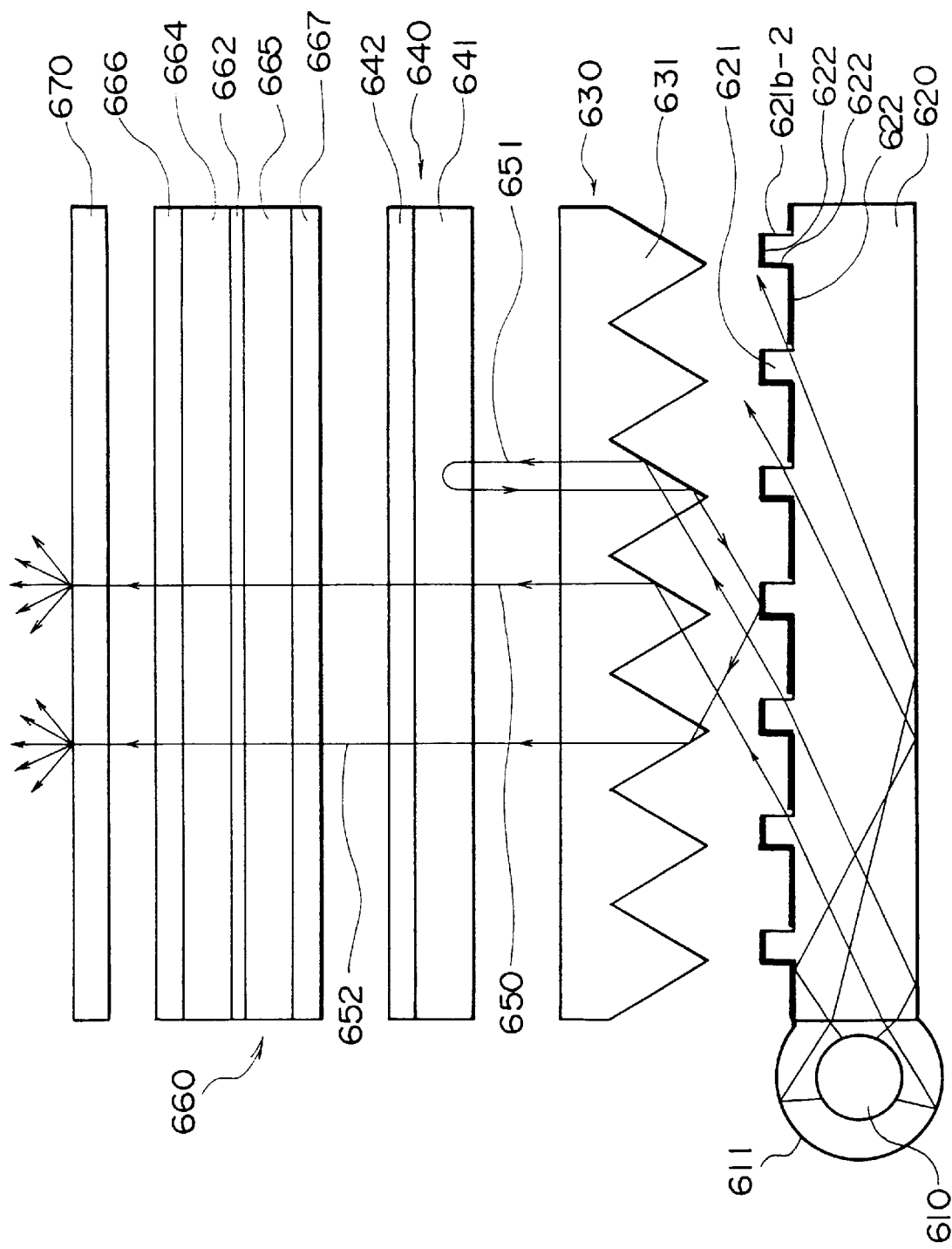
FIG. 32 is a sectional view of the liquid crystal display system as an additional embodiment of the present invention.

Embodiment 19 of the invention will now be described with reference to FIG. 32. A sectional view of a liquid crystal display system of this embodiment is shown in FIG. 32. The liquid crystal display system is similar to that of Embodiment 18 except that it comprises a light diffusing film in this embodiment.

As shown in FIG. 32, a light diffusing film 670 is provided to face a liquid crystal display panel 660 in the liquid crystal display system.

Usually, since the light direction is changed by a prism array 640 to pass through the liquid crystal display panel 660 almost perpendicularly, the display can be viewed well only from a direction substantially perpendicular to the liquid crystal display panel 660. In this embodiment, however, by the light diffusing film 670, the light from the liquid crystal display panel 660 can be diffused so that a wide viewing angle range can be provided.

Note that the arrangement of these elements is not limited to that of this embodiment. The arrangement of the elements does not matter on condition that part of the light from the light guide which has been reflected by the polarizer and returned to the reflection layer of the light guide is changed on reflection at the reflection layer such that the light can pass through the polarizer, and that the light is then converted into linearly-polarized light by passing through the polarizer.

Embodiment 20

Embodiment 20 of the invention will now be described with reference to FIGS. 33 to 36.

Figure 33:
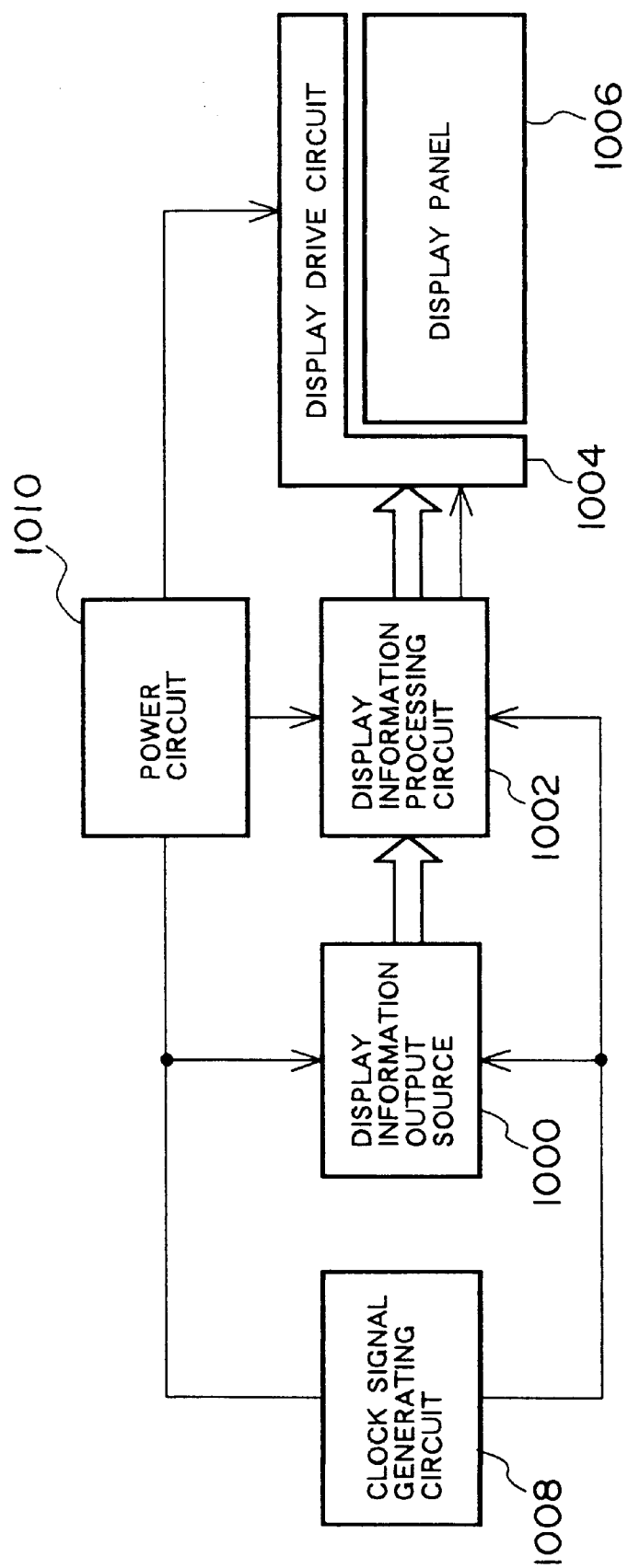
FIG. 33 is a block diagram illustrating electronic equipment using the liquid crystal display system of the present invention.

As shown in FIG. 33, electronic equipment using a liquid crystal display system of this embodiment comprises a display information output source 1000, a display information processing circuit 1002, a display drive circuit 1004, a display panel 1006 such as a liquid crystal display panel, a clock signal generating circuit 1008, and power circuit 1010. The display information output source 1000 includes memories such as ROM and RAM, tuning circuitry for tuning and outputting a television signal, or the like, and outputs display information such as a video signal based on a clock signal from the clock signal generating circuit 1008. The display information processing circuit 1002 processes the display information based on the clock signal from the clock generating circuit 1008 and outputs it. The display information processing circuit 1002 may comprise an amplification and polarity inversion circuit, a phase-development circuit, a rotation circuit, a gamma correction circuit, a clamp circuit, or the like. The display drive circuit 1004 comprises a scan-side drive circuit and a data-side drive circuit to drive the display panel 1006. The power circuit 1010 supplies power to all of the above circuits.

Figure 34:
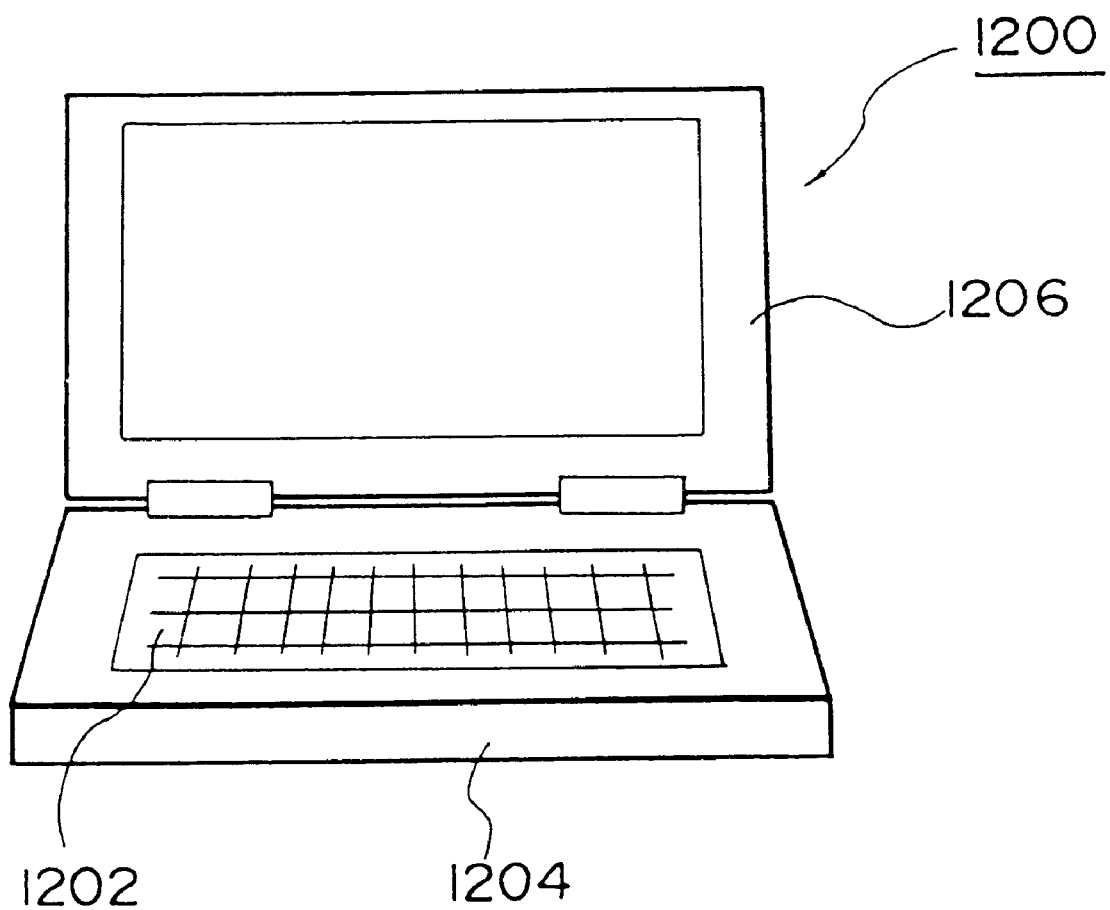
FIG. 34 is a perspective view of a personal computer as an embodiment of electronic equipment according to the present invention.
Figure 35:
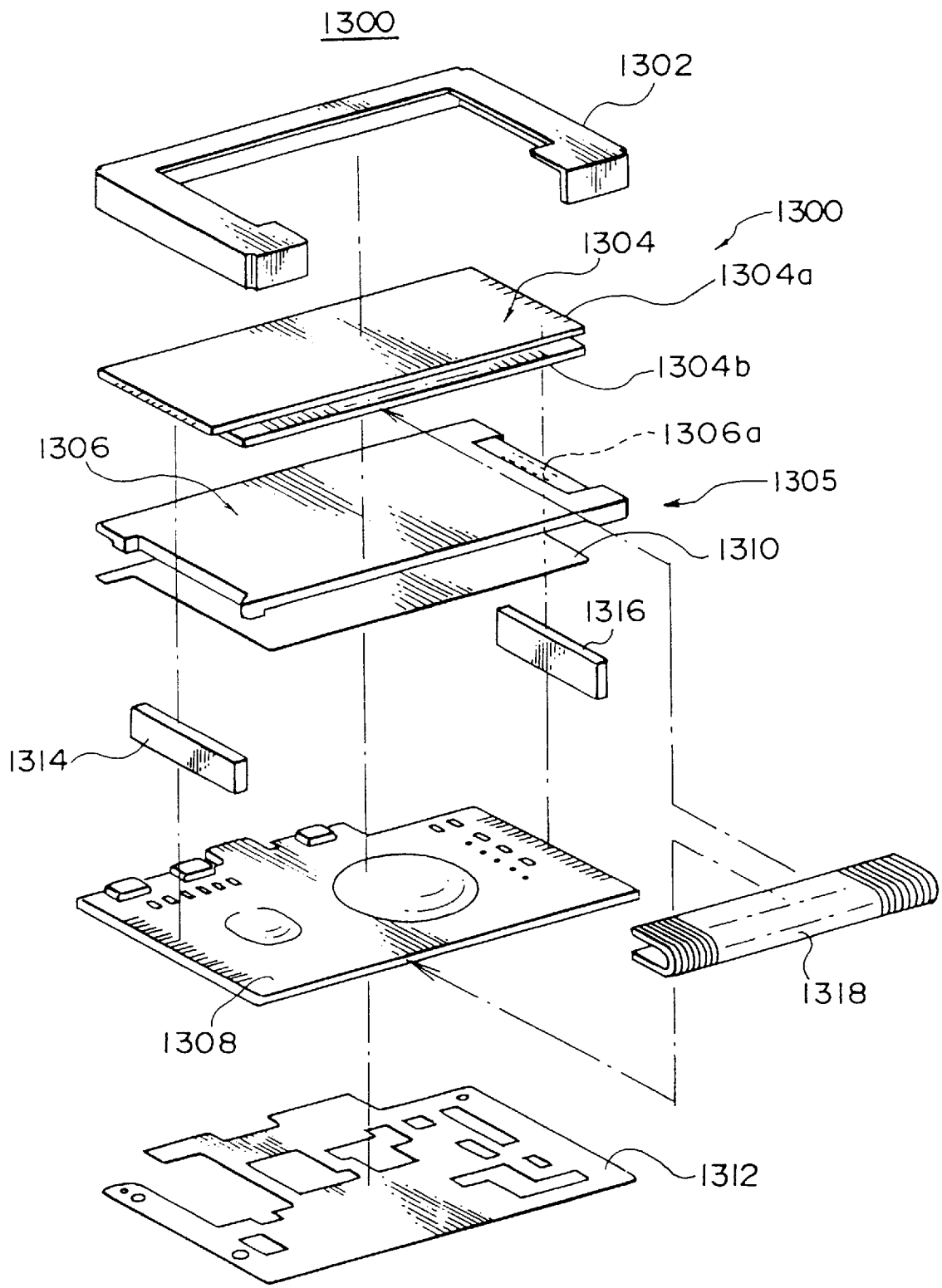
FIG. 35 is an exploded perspective view of a pager as another embodiment of electronic equipment according to the present invention.

Examples of electronic equipment of the above configuration include: a personal computer (PC) or engineering workstation (EWS) capable of providing multi-media as shown in FIG. 34, a pager as shown in FIG. 35, a portable telephone, a word processor, a television, a view-finder or monitor type of video tape recorder, an electronic notebook, an electronic calculator, a car navigation system, a terminal for point of sales (POS) system, or any device provided with a touch panel.

The personal computer 1200 shown in FIG. 34 has a main unit 1204 provided with a keyboard 1202, and a liquid crystal 20 display screen 1206.

The pager 1300 shown in FIG. 35 has a liquid crystal display board 1304, a lighting device 1305 including a light guide 1306 with a backlight 1306a, a circuit board 1308, first and second shield plates 1310 and 1312, two elastic conductors 1314 and 1316, and a film carrier tape 1318, all within a metal frame 1302. The two elastic conductors 1314 and 1316 and the film carrier tape 1318 connect the liquid crystal display board 1304 to the circuit board 1308.

The liquid crystal display board 1304 has a liquid crystal inserted between two transparent boards 1304a and 1304b, to form a dot-matrix type liquid crystal display panel. The display drive circuit 1004 of FIG. 33 can be formed on one of the transparent boards. Moreover, the display information processing circuit 1002 can be added to the display drive circuit 1004. The circuitry that is not mounted on the liquid crystal display board 1304 could be installed as external circuits to the liquid crystal display board, or could be mounted on the circuit board 1308 in the case of FIG. 35.

Figure 36:
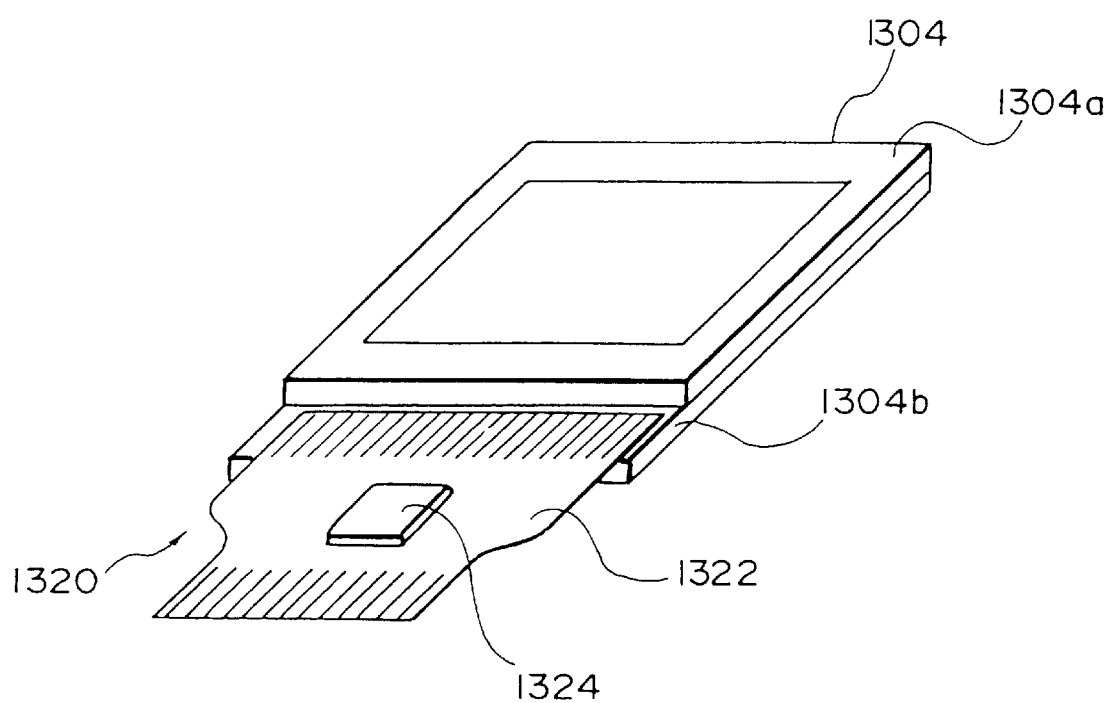
FIG. 36 is a perspective view of a tape carrier package (TCP) as a further embodiment of electronic equipment according to the present invention.
Figure 37:
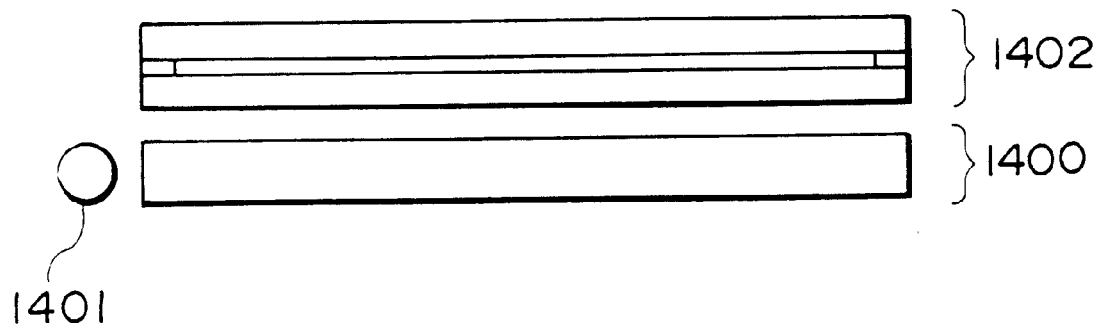
FIG. 37 is a sectional view showing an example of a conventional liquid crystal display system.
Figure 40:
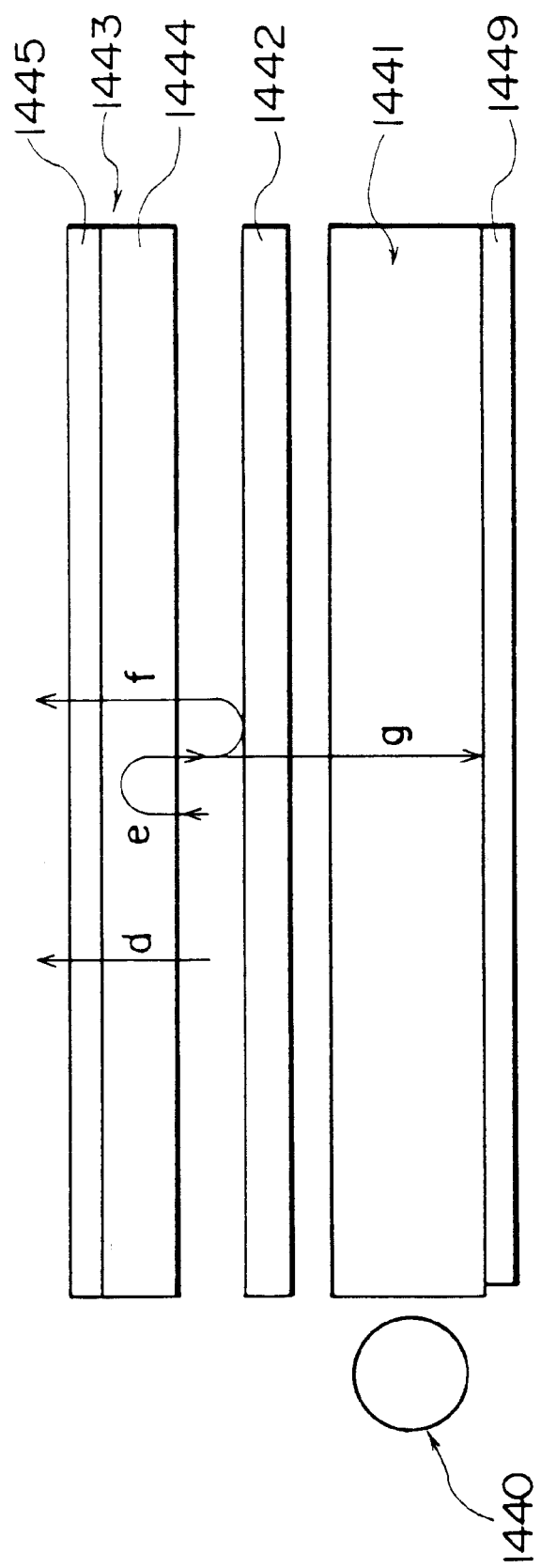
FIG. 40 is a sectional view of a conventional lighting apparatus.

Since FIG. 35 shows the configuration of a pager, the circuit board 1308 is necessary as well as the liquid crystal display board 1304. If, however, the liquid crystal display system is used as one component of an item of electronic equipment, and if the display drive circuit and other circuits can be mounted on a transparent board, the minimum unit of that liquid crystal display system is the liquid crystal display board 1304. Alternatively, a liquid crystal display board 1304 fixed to the metal frame 1302, which acts as a casing, could be used as a liquid crystal display device that is a component of electronic equipment. If a backlighting method is used, the liquid crystal display board 1304 could be assembled within the metal frame 1302 together with the light guide 1306 provided with the backlight 1306a, to configure the liquid crystal display device. As a further alternative, a tape carrier package (TCP) 1320, in which an IC chip 1324 is attached on a polyimide tape 1322 on which a conductive metal film is formed, could be connected to one of the two transparent boards 1304a and 1304b that form the liquid crystal display board 1304, as shown in FIG. 36, and this could be used as a liquid crystal display device that acts as one component of an item of electronic equipment.

It should be noted that the present invention is not limited to the above-described embodiments and various modifications can be made within the scope of the invention.

We claim:
1. A lighting apparatus comprising:
   light guiding means provided at the back of a light receiving element; and
   at least one light emitting means provided at the side of said light guiding means;

wherein said light guiding means comprises:

wherein the light from said light emitting means is transmitted to the back surface of said light receiving element for lighting said light receiving element;

a light guiding body having at least one light input surface facing said light emitting means, a light-output-side surface facing said light receiving element, and a flat surface which is opposite to said light-output-side surface; and a plurality of projections extending from said light-output-side surface of said light guiding body, each of said projections having a top surface which is substantially parallel to said light-output-side surface, a vertical section of each of said projections being substantially a trapezoid, and side surfaces of said projections being inclined at an angle of 10 degrees or less from a plane which is perpendicular to said light-output-side surface.

2. The lighting apparatus as defined in claim 1, wherein said projections have a different refractive index from said light guiding body.

3. The lighting apparatus as defined in claim 1, wherein the ratio of width of said top surface to height of each of said projections is substantially 1:1.

4. The lighting apparatus as defined in claim 3, wherein said top surface of each of said projections has a width ranging from 10 µm to 50 µm.

5. The lighting apparatus as defined in claim 1, wherein a reflection layer is provided on said light-output-side surface of said light guiding body for reflecting the light from outside and the light transmitted through said light guiding body.

6. The lighting apparatus as defined in claim 5, wherein said reflection layer is further provided on said top surface of each of said projections.

7. The lighting apparatus as defined in claim 5, wherein said reflection layer is further provided on one of said side surfaces of each of said projections when said one of said side surfaces looks toward said light emitting means.

8. The lighting apparatus as defined in claim 5, wherein said light guiding body is provided with said reflection layer on all side surfaces except said light input surface.

9. The lighting apparatus as defined in claim 5, wherein said reflection layer is made of a thin metal film.

10. The lighting apparatus as defined in claim 8, wherein said reflection layer provided on said light guiding body is made of a mirror sheet, a reflecting surface of said mirror sheet facing said light guiding body.

11. The lighting apparatus as defined in claim 1, wherein said projections are in the form of a grating on said light-output-side surface.

12. The lighting apparatus as defined in claim 1, wherein the number of said projections per unit area is smaller nearer to said light emitting means than the number of said projections farther from said light emitting means.

13. The lighting apparatus as defined in claim 1, wherein a vertical-sectional area of each of said projections is larger farther from said light emitting means than a vertical-sectional area nearer to said light emitting means.

14. The lighting apparatus as defined in claim 1, further comprising directional change means for changing the direction of the light which is output from said light guiding means to a direction substantially perpendicular to said light receiving element.

15. The lighting apparatus as defined in claim 14, wherein said light emitting means is in the form of a cylinder extending along said light input surface of said light guiding body; and wherein said directional change means includes a prism array which comprises a plurality of prisms arranged in parallel to each other and to said light emitting means, each of said prisms having an apex pointing to said light-output-side surface.

16. The lighting apparatus as defined in claim 15, wherein a vertical section of each of said prisms is substantially a triangular, an angle of said apex ranging from 50 degrees to 70 degrees.

17. The lighting apparatus as defined in claim 15, wherein each of said prisms has a first surface for receiving the light and a second surface, said apex being formed by said first and second surfaces; and wherein said first surface comprises a plurality of planes, the normals to said planes being different from each other.

18. The lighting apparatus as defined in claim 17, wherein said first surface comprises a plane tilted at an angle of about 20 degrees from the plane which is perpendicular to said light-output-side surface; and wherein said second surface is tilted at an angle of about 30 degrees from the plane which is perpendicular to said light-output-side surface.

19. The lighting apparatus as defined in claim 14, wherein said directional change means has a structure of diffraction grating which is provided parallel to said light-output-side surface.

20. The lighting apparatus as defined in claim 19, wherein said directional change means includes a hologram element which has a photosensitive layer made of a photosensitive material, said structure of diffraction grating being recorded on said photosensitive layer.

21. The lighting apparatus as defined in claim 19, wherein said structure of diffraction grating of said directional change means is a blazed grating which has a sawtooth vertical section.

22. The lighting apparatus as defined in claim 14, further comprising polarizing means which is provided between said light receiving element and said directional change means to convert the light which is output from said directional change means into linearly-polarized light.

23. The lighting apparatus as defined in claim 14, further comprising polarizing means which is provided between said light receiving element and said directional change means to convert the light which is output from said directional change means into linearly-polarized light;

wherein said polarizing means comprises:

a cholesteric liquid crystal layer provided to face said prism array; and a quarter wave film which generates retardation by a quarter wavelength and is provided on said cholesteric liquid crystal layer.

24. A lighting apparatus as defined in claim 1, wherein:

said light guiding means guides the light from said light emitting means through said light-output-side surface toward a light receiving element with an improved directivity;

said lighting apparatus further comprises directional change means for changing the direction of the light which is output from said light guiding means to a direction substantially perpendicular to said light receiving element;

said directional change means includes a prism array which comprises a plurality of prisms, each of said prisms having an apex pointing to said light-output-side surface;

each of said prisms has a first surface for receiving the light and a second surface, said apex being formed by said first and second surfaces; and said first surface comprises a plurality of planes, the normals to said planes being different from each other.

25. A liquid crystal display system comprising a lighting apparatus as defined in claim 1, wherein said light receiving element is a liquid crystal display panel.

26. The liquid crystal display system as defined in claim 25, wherein a mirror sheet which reflects the light input to said light guiding means is provided at the opposite side to said light-output-side surface of said light guiding means.

27. A liquid crystal display system comprising:

a lighting apparatus as defined in claim 1;

a liquid crystal display panel which receives the light from said lighting apparatus; and light diffusing means provided at the front of said liquid crystal display panel to diffuse the light from said liquid crystal display panel.

28. Electronic equipment comprising a liquid crystal display system as defined in claim 1.

29. The lighting apparatus as defined in claim 1, wherein each of said projections has side surfaces which are substantially perpendicular to said light-output-side surface.

30. The lighting apparatus as defined in claim 1, wherein light diffusing means for diffusing the light from said light guiding means is provided between said light receiving element and said light guiding means.

31. The liquid crystal display system as defined in claim 26, wherein light diffusing means for diffusing the light is provided at the front of said liquid crystal display panel.

32. The lighting apparatus as defined in claim 29, wherein said projections have a different refractive index from said light guiding body.

33. The lighting apparatus as defined in claim 29, wherein the ratio of width of said top surface to height of each of said projections is substantially 1:1.

34. The lighting apparatus as defined in claim 29, wherein a vertical section of each of said projections is substantially a trapezoid; and wherein said side surfaces of said projections are inclined at an angle of 10 degrees or less from a plane which is perpendicular to said light-output-side surface.

35. The lighting apparatus as defined in claim 29, wherein said top surface of each of said projections has a width ranging from 10 $\mu$m to 50 $\mu$m.

36. The lighting apparatus as defined in claim 29, wherein a reflection layer is provided on said light-output-side surface of said light guiding body for reflecting the light from outside and the light transmitted through said light guiding body.

37. The lighting apparatus as defined in claim 36, wherein said reflection layer is further provided on said top surface of each of said projections.

38. The lighting apparatus as defined in claim 36, wherein said reflection layer is further provided on one of said side surfaces of each of said projections when said one of said side surfaces looks toward said light emitting means.

39. The lighting apparatus as defined in claim 36, wherein said light guiding body is provided with said reflection layer on all side surfaces except said light input surface.

40. The lighting apparatus as defined in claim 36, wherein said reflection layer is made of a thin metal film.

41. The lighting apparatus as defined in claim 39, wherein said reflection layer provided on said light guiding body is made of a mirror sheet, a reflecting surface of said mirror sheet facing said light guiding body.

42. The lighting apparatus as defined in claim 29, wherein said projections are in the form of a grating on said light-output-side surface.

43. The lighting apparatus as defined in claim 29, wherein the number of said projections per unit area is smaller nearer to said light emitting means than the number of said projections farther from said light emitting means.

44. The lighting apparatus as defined in claim 29, wherein a vertical-sectional area of each of said projections is larger farther from said light emitting means than a vertical-sectional area nearer to said light emitting means.

45. The lighting apparatus as defined in claim 29, further comprising directional change means for changing the direction of the light which is output from said light guiding means to a direction substantially perpendicular to said light receiving element.

46. The lighting apparatus as defined in claim 45, wherein said light emitting means is in the form of a cylinder extending along said light input surface of said light guiding body; and wherein said directional change means includes a prism array which comprises a plurality of prisms arranged in parallel to each other and to said light emitting means, each of said prisms having an apex pointing said light-output-side surface.

47. The lighting apparatus as defined in claim 46, wherein a vertical section of each of said prisms is substantially triangular, an angle of said apex ranging from 50 degrees to 70 degrees.

48. The lighting apparatus as defined in claim 46, wherein each of said prisms has a first surface for receiving the light and a second surface, said apex being formed by said first and second surfaces; and wherein said first surface comprises a plurality of planes, the normals to said planes being different from each other.

49. The lighting apparatus as defined in claim 48, wherein said first surface comprises a plane tilted at an angle of about 20 degrees from the plane which is perpendicular to said light-output-side surface; and wherein said second surface is tilted at an angle of about 30 degrees from the plane which is perpendicular to said light-output-side surface.

50. The lighting apparatus as defined in claim 45, wherein said directional change means has a structure of diffraction grating which is provided parallel to said light-output-side surface.

51. The lighting apparatus as defined in claim 50, wherein said directional change means includes a hologram element which has a photosensitive layer made of a photosensitive material, said structure of diffraction grating being recorded on said photosensitive layer.

52. The lighting apparatus as defined in claim 50, wherein said structure of diffraction grating of said directional change means is a blazed grating which has a sawtooth vertical section.

53. The lighting apparatus as defined in claim 45, further comprising polarizing means which is provided between said light receiving element and said directional change means to convert the light which is output from said directional change means into linearly-polarized light.

54. The lighting apparatus as defined in claim 45, further comprising polarizing means which is provided between said light receiving element and said directional change means to convert the light which is output from said directional change means into linearly-polarized light;

wherein said polarizing means comprises:

a cholesteric liquid crystal layer provided to face said prism array; and a quarter wave film which generates retardation by a quarter wavelength and is provided on said cholesteric liquid crystal layer.

55. A liquid crystal display system comprising a lighting apparatus as defined in claim 24, wherein said light receiving element is a liquid crystal display panel.

56. The liquid crystal display system as defined in claim 55, wherein a mirror sheet which reflects the light input to said light guiding means is provided at the opposite side to said light-output-side surface of said light guiding means.

57. A liquid crystal display system comprising:

a lighting apparatus as defined in claim 24, a liquid crystal display panel which receives the light from said lighting apparatus; and light diffusing means provided at the front of said liquid crystal display panel to diffuse the light from said liquid crystal display panel.

58. Electronic equipment comprising a liquid crystal display system as defined in claim 55.

59. The liquid crystal display system as defined in claim 56, wherein light diffusing means for diffusing the light is provided at the front of said liquid crystal display panel.

60. A liquid crystal display system comprising a lighting apparatus as defined in claim 29, wherein said light receiving element is a liquid crystal display panel.

61. The liquid crystal display system as defined in claim 60, wherein a mirror sheet which reflects the light input to said light guiding means is provided at the opposite side to said light-output-side surface of said light guiding means.

62. A liquid crystal display system comprising:

a lighting apparatus as defined in claim 29, a liquid crystal display panel which receives the light from said lighting apparatus; and light diffusing means provided at the front of said liquid crystal display panel to diffuse the light from said liquid crystal display panel.

63. Electronic equipment comprising a liquid crystal display system as defined in claim 60.

64. The lighting apparatus as defined in claim 29, wherein light diffusing means for diffusing the light from said light guiding means is provided between said light receiving element and said light guiding means.

65. The liquid crystal display system as defined in claim 61, wherein light diffusing means for diffusing the light is provided at the front of said liquid crystal display panel.

* * * * *

UNITED STATES PATENT AND TRADEMARK OFFICE
CERTIFICATE OF CORRECTION

PATENT NO. : 6,011,602
DATED : January 4, 2000
INVENTOR(S) : Satoru MIYASHITA, Osamu Yokoyama and Tatsuaki FUNAMOTO It is certified that error appears in the above-identified patent and that said Letters Patent is hereby corrected as shown below:

The Title should be corrected as follows:

"LIGHTING APPARATUS, WITH HIGH LIGHT DIRECTIVITY, LIQUID CRYSTAL DISPLAY SYSTEM USING THE SAME AND ELECTRONIC EQUIPMENT USING THE SAME".

Signed and Sealed this

Third Day of April, 2001

Attest:

NICHOLAS P. GODICI

*Attesting Officer*     Acting Director of the United States Patent and Trademark Office